(12) United States Patent
Liu et al.

(10) Patent No.: US 11,665,648 B2
(45) Date of Patent: *May 30, 2023

(54) METHOD AND DEVICE IN A NODE USED FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMIIED, Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/864,421

(22) Filed: Jul. 14, 2022

(65) Prior Publication Data

US 2022/0353826 A1 Nov. 3, 2022

Related U.S. Application Data

(63) Continuation of application No. 16/799,847, filed on Feb. 25, 2020, now Pat. No. 11,445,449.

(30) Foreign Application Priority Data

Feb. 25, 2019 (CN) .......................... 201910137430.0

(51) Int. Cl.
*H04W 52/32* (2009.01)
*H04W 52/14* (2009.01)
(Continued)

(52) U.S. Cl.
CPC ....... *H04W 52/325* (2013.01); *H04W 52/143* (2013.01); *H04W 52/367* (2013.01); *H04W 76/27* (2018.02)

(58) Field of Classification Search
CPC ............. H04W 52/325; H04W 52/247; H04W 52/143; H04W 52/362; H04W 52/367;
(Continued)

(56) References Cited

U.S. PATENT DOCUMENTS

2016/0219504 A1* 7/2016 Cho .................... H04W 52/242
2018/0035427 A1* 2/2018 Gupta .................. H04W 72/02
(Continued)

*Primary Examiner* — Ian N Moore
*Assistant Examiner* — Sun Jong Kim

(57) ABSTRACT

The present disclosure provides a method and a device in a node used for wireless communication. A first node receives a first information element, the first information element being used for indicating a first reference power value; and receives a second information set, the second information set comprising a second information element, the second information element being used for indicating a second limit power value; and transmits a first radio signal with a first power value; a target receiver of the first radio signal includes a transmitter of the first information element, the first power value is related to a smaller value between the first reference power value and the second limit power value. Taking into account restrictions resulted from interference when adjusting a transmitting power of a desired signal, the present disclosure can address interferences that may occur in V2X system in unicast or groupcast transmission.

20 Claims, 13 Drawing Sheets

(51) Int. Cl.
*H04W 52/36* (2009.01)
*H04W 76/27* (2018.01)

(58) Field of Classification Search
CPC ... H04W 52/383; H04W 76/27; H04W 52/16; H04W 52/146
See application file for complete search history.

(56) References Cited

U.S. PATENT DOCUMENTS

2020/0229105 A1* 7/2020 Cai ................... H04W 52/242
2021/0112503 A1* 4/2021 Zhang ................ H04B 17/345

* cited by examiner

METHOD AND DEVICE IN A NODE USED FOR WIRELESS COMMUNICATION

CROSS-REFERENCE TO RELATED APPLICATION

This application is the continuation of the U.S. patent application Ser. No. 16/799,847, filed on Feb. 25, 2020, which claims the priority benefit of Chinese Patent Application No. 20191013743.0, filed on Feb. 25, 2019, the full disclosure of which is incorporated herein by reference.

BACKGROUND

Technical Field

The present disclosure relates to transmission methods and devices in wireless communication systems, and in particular to a transmission scheme and device for sidelink and power control in wireless communication.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR. In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPPRAN #80 Plenary Session, the technical Study Item (SI) of NR V2X was initialized, and later at the first AdHoc conference of RAN1 2019 it was generally agreed that the pathloss between a transmitter and a receiver in a V2X pair shall be taken as reference for the V2X transmitting power.

SUMMARY

When discussing Device to Device (D2D) and V2X in Rel-12/13/14, transmitting power on sidelink is generally acquired on the basis of a pathloss between a base station and a terminal, so as to ensure that radio signals transmitted on the sidelink will not affect uplink reception of the base station. In NR-based V2X of Rel-15, however, not only broadcast communication is supported, but groupcast and unicast communication will be supported. Therefore, interferences between radio signals on V2X links need to be considered.

To address the above problem, the present disclosure provides a solution for power control so as to strike a balance between efficient receiving of a desired signal and the impact of an interfering signal. It should be noted that the embodiments of the UE of the present disclosure and the characteristics in the embodiments may be applied to a base station if no conflict is incurred, and vice versa. In the case of no conflict, the embodiments of the present disclosure and the characteristics in the embodiments may be combined with each other arbitrarily. Furthermore, though originally targeted at single-carrier communications, the present disclosure is also applicable to multi-carrier communications.

The present disclosure provides a method in a first node for wireless communication, comprising:
receiving a first information element, the first information element being used for indicating a first reference power value;
receiving a second information set, the second information set comprising a second information element, the second information element being used for indicating a second limit power value; and
transmitting a first radio signal with a first power value;
herein, a target receiver of the first radio signal includes a transmitter of the first information element, the first power value is related to a smaller value between the first reference power value and the second limit power value.

In one embodiment, a problem needed to be solved in the present disclosure is that radio signal communications between V2X links will be mutually interfering as a result of an introduction of groupcast and unicast transmissions into NR V2X system.

In one embodiment, the above method is characterized in that a connection is created between a first power value and a second limit power value.

In one embodiment, the above method is characterized in that a connection is created between a first power value and a first reference power value as well as a second limit power value.

In one embodiment, the above method is characterized in that an adjustment of a transmitting power of a desired signal will take into account interference with other UEs.

In one embodiment, an advantage of the above method is that a compromise is reached between adjusting a transmitting power of desired signal and interfering with other UEs, thereby guaranteeing effective communication within a whole network.

According to one aspect of the present disclosure, the above method is characterized in comprising:
receiving a first target radio signal so as to determine a first power compensation; and
receiving a second target signal set, the second target signal set comprising a second target radio signal, the second target radio signal being used for determining a second power compensation;
herein, a transmitter of the first target radio signal and a transmitter of the first information element are co-located, while a transmitter of the second target radio signal and a transmitter of the second information element are co-located; the second limit power value is related to the first power compensation and the second power compensation.

According to one aspect of the present disclosure, the above method is characterized in that the first information element indicates a first coefficient; the second limit power value is linearly correlated with the first coefficient.

According to one aspect of the present disclosure, the above method is characterized in that the second information element indicates a second power offset; the second limit power value is linearly correlated with the second power offset.

According to one aspect of the present disclosure, the above method is characterized in that the second information set comprises Q second-type information elements, the second information element is one of the Q second-type information elements, Q is a positive integer greater than 1; the Q second-type information elements are respectively used for indicating Q limit power values, the second limit power value is a smallest value of the Q limit power values.

According to one aspect of the present disclosure, the above method is characterized in that the first power value is a smaller value between a maximum transmitting power value and a first candidate power value, the first candidate power value is linearly correlated with a smaller value between the first reference power value and the second limit power value, with a correlation coefficient being 1.

According to one aspect of the present disclosure, the above method is characterized in comprising:

transmitting a second radio signal with a second power value;

herein, the first information element is used for indicating a first limit power value, the second information element is used for indicating a second reference power value; a target receiver of the second radio signal includes a transmitter of the second information element, the second power value is related to a smaller value between the second reference power value and the first limit power value.

According to one aspect of the present disclosure, the above method is characterized in that the first node is a UE.

According to one aspect of the present disclosure, the above method is characterized in that the first node is a base station.

According to one aspect of the present disclosure, the above method is characterized in that the first node is a relay node.

The present disclosure provides a method in a second node for wireless communication, comprising:

transmitting a first information element, the first information element being used for indicating a first reference power value; and receiving a first radio signal;

herein, a first power value is a transmitting power of the first radio signal, the first power value is related to a smaller value between the first reference power value and a second limit power value, the second limit power value is indicated by second information element, the second information element belongs to a second information set, a target receiver of the second information set includes a transmitter of the first radio signal.

According to one aspect of the present disclosure, the above method is characterized in comprising:

transmitting a first target radio signal, the first target radio signal being used for determining a first power compensation;

herein, a second target radio signal is used for determining a second power compensation, a transmitter of the second target radio signal and a transmitter of the second information element are co-located, the second target radio signal belongs to a second target signal set, a target receiver of the second target signal set includes a target receiver of the first target radio signal, the second limit power value is related to the first power compensation and the second power compensation.

According to one aspect of the present disclosure, the above method is characterized in that the first information element indicates a first coefficient; the second limit power value is linearly correlated with the first coefficient.

According to one aspect of the present disclosure, the above method is characterized in that the second information element indicates a second power offset; the second limit power value is linearly correlated with the second power offset.

According to one aspect of the present disclosure, the above method is characterized in that the second information set comprises Q second-type information elements, the second information element is one of the Q second-type information elements, Q is a positive integer greater than 1; the Q second-type information elements are respectively used for indicating Q limit power values, the second limit power value is a smallest value of the Q limit power values.

According to one aspect of the present disclosure, the above method is characterized in that the first power value is a smaller value between a maximum transmitting power value and a first candidate power value, the first candidate power value is linearly correlated with a smaller value between the first reference power value and the second limit power value, with a correlation coefficient being 1.

According to one aspect of the present disclosure, the above method is characterized in that the first information element is used for indicating a first limit power value, the second information element is used for indicating a second reference power value; a target receiver of the second radio signal includes a transmitter of the second information element, and the target receiver of the second radio signal does not include the second node; a second power value is a transmitting power of the second radio signal, the second power value is related to a smaller value between the second reference power value and the first limit power value.

According to one aspect of the present disclosure, the above method is characterized in that the second node is a UE.

According to one aspect of the present disclosure, the above method is characterized in that the second node is a base station.

According to one aspect of the present disclosure, the above method is characterized in that the second node is a relay node.

The present disclosure provides a method in a third node for wireless communication, comprising:

transmitting a second information element, the second information element belonging to a second information set, and the second information element being used for indicating a second limit power value;

herein, a first reference power value is indicated by a first information element, a first power value is a transmitting power of the first radio signal, the first power value is related to a smaller value between the first reference power value and the second limit power value, a target receiver of the second information set includes a transmitter of the first radio signal, and a target receiver of the first radio signal does not include the third node.

According to one aspect of the present disclosure, the above method is characterized in comprising:

transmitting a second target radio signal, the second target radio signal being used for determining a second power compensation;

herein, a first target radio signal is used for determining a first power compensation, a transmitter of the first target radio signal and a transmitter of the first information element are co-located; the second target radio signal belongs to a second target signal set, a target receiver of the second target signal set includes a target receiver of the second target radio signal; the second limit power value is related to the first power compensation and the second power compensation.

According to one aspect of the present disclosure, the above method is characterized in that the first information element indicates a first coefficient, and the second limit power value is linearly correlated to the first coefficient.

According to one aspect of the present disclosure, the above method is characterized in that the second information element indicates a second power offset, and the second limit power value is linearly correlated to the second power offset.

According to one aspect of the present disclosure, the above method is characterized in that the second information set comprises Q second-type information elements, the second information element is one of the Q second-type information elements, Q is a positive integer greater than 1; the Q second-type information elements are respectively used for indicating Q limit power values, the second limit power value is a smallest value of the Q limit power values.

According to one aspect of the present disclosure, the above method is characterized in that the first power value is a smaller value between a maximum transmitting power value and a first candidate power value, the first candidate power value is linearly correlated with a smaller value between the first reference power value and the second limit power value, with a correlation coefficient being 1.

According to one aspect of the present disclosure, the above method is characterized in comprising:

receiving a second radio signal;

herein, a second power value is a transmitting power of the second radio signal, the first information element is used for indicating a first limit power value, while the second information element is used for indicating a second reference power value; the second power value is related to a smaller value between the second reference power value and the first limit power value.

According to one aspect of the present disclosure, the above method is characterized in that the third node is a UE.

According to one aspect of the present disclosure, the above method is characterized in that the third node is a base station.

According to one aspect of the present disclosure, the above method is characterized in that the third node is a relay node.

The present disclosure provides a first node for wireless communication, comprising:

a first receiver, receiving a first information element, the first information element being used for indicating a first reference power value;

wherein the first receiver receives a second information set, the second information set comprising a second information element, the second information element being used for indicating a second limit power value; and a first transmitter, transmitting a first radio signal with a first power value;

herein, a target receiver of the first radio signal includes a transmitter of the first information element, the first power value is related to a smaller value between the first reference power value and the second limit power value.

The present disclosure provides a second node for wireless communication, comprising:

a second transmitter, transmitting a first information element, the first information element being used for indicating a first reference power value; and a third receiver, receiving a first radio signal; a first power value is a transmitting power of the first radio signal, the first power value is related to a smaller value between the first reference power value and a second limit power value, the second limit power value is indicated by second information element, the second information element belongs to a second information set, a target receiver of the second information set includes a transmitter of the first radio signal.

The present disclosure provides a third node for wireless communication, comprising:

a fourth transmitter, transmitting a second information element, the second information element belonging to a second information set, the second information element being used for indicating a second limit power value;

herein, a first reference power value is indicated by a first information element, a first power value is a transmitting power of the first radio signal, the first power value is related to a smaller value between the first reference power value and the second limit power value, a target receiver of the second information set includes a transmitter of the first radio signal, and a target receiver of the first radio signal does not include the third node.

In one embodiment, the present disclosure is advantageous in the following aspects:

The present disclosure creates a connection between a first power value and a second limit power value.

The present disclosure creates a connection between a first power value and a first reference power value, and between a first power value and a second limit power value.

The present disclosure takes into account interferences to other UEs in adjustment of a transmitting power of a desired signal.

The present disclosure adjusts a transmitting power of a desired signal to counterbalance interferences with other UEs, thus ensuring the effective communication of the whole network.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
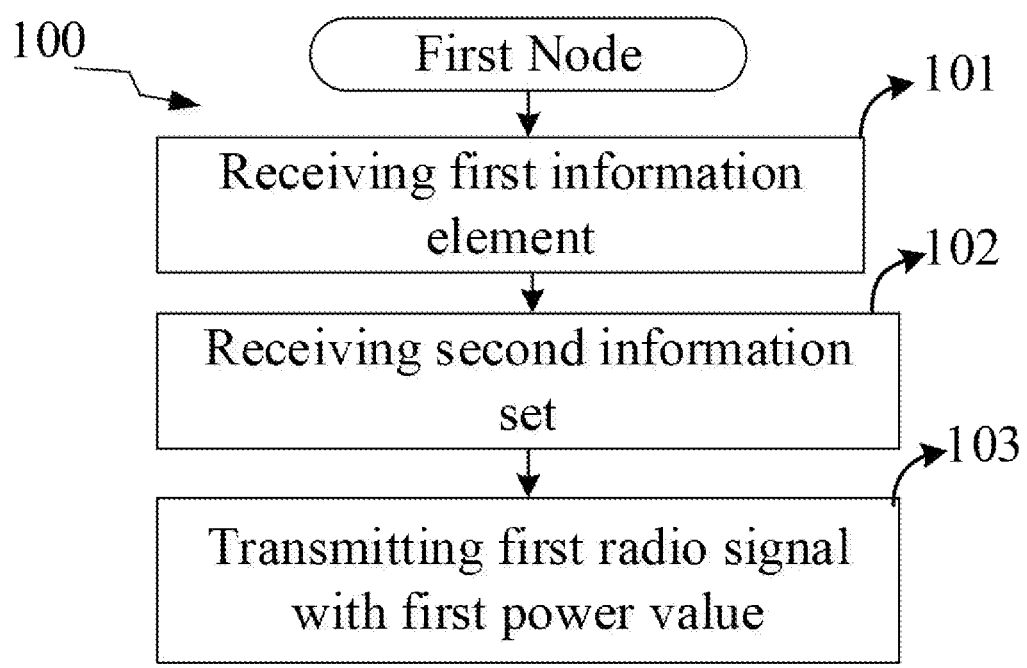
FIG. 1 illustrates a flowchart of processing of a first node according to one embodiment of the present disclosure.

Embodiment 1 illustrates a flowchart of processing of a first node according to one embodiment of the present disclosure, as shown in FIG. 1. In FIG. 1, each box represents a step. In Embodiment 1, a first node in the present disclosure first takes step S101, in which a first information element is received; and then takes step S102, in which a second information set is received; and finally takes step S103, in which a first radio signal is transmitted with a first power value; the first information element is used for indicating a first reference power value; the second information set comprises a second information element, the second information element is used for indicating a second limit power value; a target receiver of the first radio signal includes a transmitter of the first information element, the first power value is related to a smaller value between the first reference power value and the second limit power value.

In one embodiment, the first reference power value is expected receiving power of a transmitter of the first information element when receiving the first radio signal.

In one embodiment, the first reference power value includes a first nominal reference power value.

In one embodiment, the first reference power value includes the first nominal reference power value and a first UE reference power value.

In one embodiment, the first reference power value includes a sum of the first nominal reference power value and the first UE reference power value.

In one embodiment, the first reference power value includes a product of the first nominal reference power value and the first UE reference power value.

In one embodiment, the first reference power value is composed of a sum of the first nominal reference power value and the first UE reference power value.

In one embodiment, the first reference power value only includes the first nominal reference power value, rather than the first UE reference power value.

In one embodiment, the first nominal reference power value is cell-specific, while the first UE reference power value is UE-specific.

In one embodiment, the first nominal reference power value is common to a plurality of UEs, while the first UE reference power value is specific to the first node.

In one embodiment, the first nominal reference power value is provided by a higher layer signaling, the first UE reference power value is 0.

In one embodiment, the first reference power value is $P_O$.

In one embodiment, the first nominal reference power value is $P_{O\_NOMINAL}$.

In one embodiment, the first UE reference power value is $P_{O\_UE}$.

In one embodiment, the first nominal reference power value is $P_{O\_NOMINAL\_PSSCH}$, and the first UE reference power value is $P_{O\_UE\_PSSCH}$.

In one embodiment, the first nominal reference power value is $P_{O\_NOMINAL\_PSCCH}$.

In one embodiment, the first nominal reference power value is $P_{O\_NOMINAL\_PSCCH}$, and the first UE reference power value is $P_{O\_UE\_PSCCH}$.

In one embodiment, the first nominal reference power value is $P_{O\_NOMINAL\_PUSCH}$, and the first UE reference power value is $P_{O\_UE\_PUSCH}$.

In one embodiment, the first nominal reference power value is $P_{O\_NOMINAL\_PUCCH}$.

In one embodiment, the first nominal reference power value is $P_{O\_NOMINAL}$_PUCCH, and the first UE reference power value is $P_{O\_UE\_PUCCH}$.

In one embodiment, the first reference power value is measured by dBm.

In one embodiment, the first reference power value is measured by mW.

In one embodiment, the first nominal reference power value and the first UE reference power value are both measured by dBm.

In one embodiment, the first nominal reference power value and the first UE reference power value are both measured by mW.

In one embodiment, the first nominal reference power value and the first UE reference power value are respectively provided by two higher layer signalings.

In one embodiment, the first nominal reference power value and the first UE reference power value are respectively provided by two Radio Resource Control (RRC) layer signalings.

In one embodiment, the first nominal reference power value is provided by a higher layer signaling, and the first UE reference power value is determined together by a higher layer signaling and a physical layer signaling.

In one embodiment, the first nominal reference power value is provided by an RRC layer signaling, while the first UE reference power value is determined together by another RRC layer signaling and a piece of Sidelink Control Information (SCI).

In one embodiment, the first information element is used for indicating the first reference power value.

In one embodiment, the first information element comprises the first reference power value.

In one embodiment, the first reference power value is one of a positive integer number of field(s) comprised in the first information element.

In one embodiment, the first information element is used for indicating the first nominal reference power value.

In one embodiment, the first information element comprises the first nominal reference power value.

In one embodiment, the first nominal reference power value is one of a positive integer number of field(s) comprised in the first information element.

In one embodiment, the first information element is used for indicating the first UE reference power value.

In one embodiment, the first information element comprises the first UE reference power value.

In one embodiment, the first UE reference power value is one of a positive integer number of field(s) comprised in the first information element.

In one embodiment, the first nominal reference power value is provided by the first information element, while the first UE reference power value is provided by an RRC layer signaling.

In one embodiment, the first nominal reference power value is provided by the first information element, while the first UE reference power value is determined together by an RRC layer signaling and a piece of SCI.

In one embodiment, the first nominal reference power value is provided by an RRC layer signaling while the first UE reference power value is provided by the first information element.

In one embodiment, the first information element comprises the first nominal reference power value, and does not comprise the first UE reference power value.

In one embodiment, the first information element does not comprise the first nominal reference power value, but instead comprises the first UE reference power value.

In one embodiment, the first information element comprises the first nominal reference power value and the first UE reference power value.

In one embodiment, the first information element is transmitted on a Sidelink Shared Channel (SL-SCH).

In one embodiment, the first information element is transmitted on a Downlink Shared Channel (DL-SCH).

In one embodiment, the first information element is transmitted on a Physical Sidelink Control channel (PSCCH).

In one embodiment, the first information element is transmitted on a Physical Sidelink Shared channel (PSSCH).

In one embodiment, the first information element is transmitted on a Physical Sidelink Broadcast channel (PSBCH).

In one embodiment, the first information element is transmitted on a Physical Sidelink Discovery channel (PSDCH).

In one embodiment, the first information element is transmitted on a Physical Downlink Control channel (PDCCH).

In one embodiment, the first information element is transmitted on a Physical Downlink Shared channel (PDSCH).

In one embodiment, the first information element is transmitted on a PSCCH and a PSSCH.

In one embodiment, the first information element is transmitted on a PDCCH and a PDSCH.

In one embodiment, the first information element is transmitted via broadcast.

In one embodiment, the first information element is transmitted via groupcast.

In one embodiment, the first information element is transmitted via unicast.

In one embodiment, the first information element is cell-specific.

In one embodiment, the first information element is UE-specific.

In one embodiment, the first information element comprises all or part of a higher layer signaling.

In one embodiment, the first information element comprises all or part of an RRC layer signaling.

In one embodiment, the first information element comprises one or more fields of an RRC Information Element (IE).

In one embodiment, the first information element comprises one or more fields of a System Information Block (SIB).

In one embodiment, the first information element comprises all or part of a Multimedia Access Control (MAC) layer signaling.

In one embodiment, the first information element comprises one or more fields of a MAC Control Element (CE).

In one embodiment, the first information element comprises one or more fields of a Physical (PHY) layer signaling.

In one embodiment, the first information element comprises one or more fields of a piece of SCI.

In one embodiment, the first information element comprises one or more fields of a SCI format.

In one embodiment, the first information element comprises one or more fields of a piece of Downlink Control Information (SCI).

In one embodiment, the first information element comprises one or more fields of a DCI format.

In one embodiment, the first information element is an RRC layer signaling.

In one embodiment, the first information element is an IE in an RRC layer signaling.

In one embodiment, the first information element is a field of an RRC IE.

In one embodiment, the first information element is semi-statically configured.

In one embodiment, the first information element is dynamically configured.

In one embodiment, the first information element is configurable.

In one embodiment, the first information element is pre-configured.

In one embodiment, the second information element belongs to the second information set.

In one embodiment, the second information element only comprises the second information element.

In one embodiment, the second information element is transmitted on an SL-SCH.

In one embodiment, the second information element is transmitted on a DL-SCH.

In one embodiment, the second information element is transmitted on a PSCCH.

In one embodiment, the second information element is transmitted on a PSSCH.

In one embodiment, the second information element is transmitted on a PSBCH.

In one embodiment, the second information element is transmitted on a PSDCH.

In one embodiment, the second information element is transmitted on a PDCCH.

In one embodiment, the second information element is transmitted on a PDSCH.

In one embodiment, the second information element is transmitted on a PSCCH and a PSSCH.

In one embodiment, the second information element is transmitted on a PDCCH and a PDSCH.

In one embodiment, the second information element is transmitted via broadcast.

In one embodiment, the second information element is transmitted via groupcast.

In one embodiment, the second information element is transmitted via unicast.

In one embodiment, the second information element is cell-specific.

In one embodiment, the second information element is UE-specific.

In one embodiment, the second information element comprises all or part of a higher layer signaling.

In one embodiment, the second information element comprises all or part of an RRC layer signaling.

In one embodiment, the second information element comprises one or more fields of an RRC IE.

In one embodiment, the second information element comprises one or more fields of a SIB.

In one embodiment, the second information element comprises all or part of a MAC layer signaling.

In one embodiment, the second information element comprises one or more fields of a MAC CE.

In one embodiment, the second information element comprises one or more fields of a PHY layer signaling.

In one embodiment, the second information element comprises one or more fields of a piece of SCI.

In one embodiment, the second information element comprises one or more fields of a SCI format.

In one embodiment, the second information element comprises one or more fields of a piece of a DCI.

In one embodiment, the second information element comprises one or more fields of a DCI format.

In one embodiment, the second information element is an RRC layer signaling.

In one embodiment, the second information element is an IE in an RRC layer signaling.

In one embodiment, the second information element is a field of an RRC IE.

In one embodiment, the second information element is semi-statically configured.

In one embodiment, the second information element is dynamically configured.

In one embodiment, the second information element is configurable.

In one embodiment, the second information element is pre-configured.

In one embodiment, the second limit power value is a limit power due to interference of a transmitter of the second information element when receiving the first radio signal.

In one embodiment, the second limit power value includes a second nominal limit power value.

In one embodiment, the second limit power value includes the second nominal limit power value and a second UE limit power value.

In one embodiment, the second limit power value includes a sum of the second nominal limit power value and the second UE limit power value.

In one embodiment, the second limit power value includes a product of the second nominal limit power value and the second UE limit power value.

In one embodiment, the second limit power value is composed of a sum of the second nominal limit power value and the second UE limit power value.

In one embodiment, the second limit power value only includes the second nominal limit power value, rather than the second UE limit power value.

In one embodiment, the second nominal limit power value is cell-specific, while the second UE limit power value is UE-specific.

In one embodiment, the second nominal limit power value is common to a plurality of UEs, while the second UE limit power value is specific to the first node.

In one embodiment, the second limit power value is measured by dBm.

In one embodiment, the second limit power value is measured by mW.

In one embodiment, the second nominal limit power value and the second UE limit power value are both measured by dBm.

In one embodiment, the second nominal limit power value and the second UE limit power value are both measured by mW.

In one embodiment, the second limit power value is related to a second reference power value.

In one embodiment, the second reference power value is $P_O$.

In one embodiment, the second reference power value includes a second nominal reference power value.

In one embodiment, the second nominal reference power value is $P_{O\_NOMINAL}$.

In one embodiment, the second nominal reference power value is $P_{O\_NOMINAL\_PSSCH}$.

In one embodiment, the second reference power value includes a second UE reference power value.

In one embodiment, the second UE reference power value is $P_{O\_UE}$.

In one embodiment, the second UE reference power value is $P_{O\_UE\_PSSCH}$.

In one embodiment, the second reference power value includes the second nominal reference power value and the second UE reference power value.

In one embodiment, the second limit power value is related to a second power offset.

In one embodiment, the first power compensation is used for determining the second limit power value.

In one embodiment, the second limit power value is linearly correlated to the first power compensation.

In one embodiment, the second power compensation is used for determining the second limit power value.

In one embodiment, the second limit power value is linearly correlated to the second power compensation.

In one embodiment, the second limit power value is linearly correlated to the second reference power value and the second power offset.

In one embodiment, the second limit power value is linearly correlated to the second reference power value, the second power offset and the second power compensation.

In one embodiment, the second limit power value is linearly correlated to the second reference power value, the second power offset, the second power compensation and the first power compensation.

In one embodiment, the second limit power value is linearly correlated to the first power compensation, and the second limit power value is linearly correlated to the second power compensation.

In one embodiment, a linear correlation coefficient between the second limit power value and the first power compensation is greater than 0 and no greater than 1; a linear correlation coefficient between the second limit power value and the second power compensation is less than 0 and no less than −1.

In one embodiment, a linear correlation coefficient between the second limit power value and the first power compensation is configurable; a linear correlation coefficient between the second limit power value and the second power compensation is fixed.

In one embodiment, the second limit power value is linearly correlated to a sum of the first power compensation and the second power compensation.

In one embodiment, the second limit power value is in direct proportion to a sum of the first power compensation and the second power compensation.

In one embodiment, the second limit power value is a sum of the first power compensation and the second power compensation.

In one embodiment, the first reference power value and the second limit power value are both measured by dBm.

In one embodiment, the first reference power value and the second limit power value are both measured by mW.

In one embodiment, the second information element is used for indicating the second limit power value.

In one embodiment, the second information element comprises the second limit power value.

In one embodiment, the second limit power value is one of a positive integer number of field(s) comprised in the second information element.

In one embodiment, the second information element is used for indicating the second nominal limit power value.

In one embodiment, the second information element comprises the second nominal limit power value.

In one embodiment, the second nominal limit power value is one of a positive integer number of field(s) comprised in the second information element.

In one embodiment, the second information element is used for indicating the second UE limit power value.

In one embodiment, the second information element comprises the second UE limit power value.

In one embodiment, the second UE limit power value is one of a positive integer number of field(s) comprised in the second information element.

In one embodiment, the second information element is used for indicating the second reference power value.

In one embodiment, the second information element comprises the second reference power value.

In one embodiment, the second reference power value is one of a positive integer number of field(s) comprised in the second information element.

In one embodiment, the second information element is used for indicating the second nominal reference power value.

In one embodiment, the second information element comprises the second nominal reference power value.

In one embodiment, the second nominal reference power value is one of a positive integer number of field(s) comprised in the second information element.

In one embodiment, the second information element is used for indicating the second UE reference power value.

In one embodiment, the second information element comprises the second UE reference power value.

In one embodiment, the second UE reference power value is one of a positive integer number of field(s) comprised in the second information element.

In one embodiment, the second nominal reference power value is provided by the second information element, while the second UE reference power value is provided by an RRC layer signaling.

In one embodiment, the second nominal reference power value is provided by the second information element, while the second UE reference power value is determined together by an RRC layer signaling and a piece of SCI.

In one embodiment, the second nominal reference power value is provided by an RRC layer signaling, while the first UE reference power value is provided by the second information element.

In one embodiment, the second information element comprises the second nominal reference power value, but does not comprise the second UE reference power value.

In one embodiment, the second information element does not comprise the second nominal reference power value, but instead comprises the second UE reference power value.

In one embodiment, the second information element comprises the second nominal reference power value and the second UE reference power value.

In one embodiment, the second information element is used for indicating the second power offset.

In one embodiment, the second information element comprises the second power offset.

In one embodiment, the second power offset is one of a positive integer number of field(s) comprised in the second information element.

In one embodiment, the second information element is used for indicating the first power compensation.

In one embodiment, the second information element comprises the first power compensation.

In one embodiment, the first power compensation is one of a positive integer number of field(s) comprised in the second information element.

In one embodiment, the second information element is used for indicating the second power compensation.

In one embodiment, the second information element comprises the second power compensation.

In one embodiment, the second power compensation is one of a positive integer number of field(s) comprised in the second information element.

In one embodiment, the second information element comprises an RRC layer signaling.

In one embodiment, the second information element comprises an IE of an RRC layer signaling.

In one embodiment, the second information element comprises a field in an IE of an RRC layer signaling.

In one embodiment, the second information element comprises one or more fields of a piece of SCI.

In one embodiment, the second information element comprises one or more fields of an SCI format.

In one embodiment, the second information element is configurable.

In one embodiment, the second information element is pre-configured.

In one embodiment, a transmitter of the first information element and a transmitter of the second information element are non-co-located.

In one embodiment, a transmitter of the first information element and a transmitter of the second information element are respectively two different communication nodes.

In one embodiment, a transmitter of the first information element and a transmitter of the second information element are respectively two different UEs.

In one embodiment, a backhaul link between a transmitter of the first information element and a transmitter of the second information element is not ideal (i.e., the latency is non-ignorable).

In one embodiment, a transmitter of the first information element and a transmitter of the second information element do not share a same baseband unit.

In one embodiment, a transmitter of any second-type information element in the second information set and a transmitter of the first information element are non-co-located.

In one embodiment, a transmitter of any second-type information element in the second information set and a transmitter of the first information element are different UEs respectively.

In one embodiment, a backhaul link between a transmitter of any second-type information element in the second information set and a transmitter of the first information element is not ideal (i.e., the latency is non-ignorable).

In one embodiment, a transmitter of any second-type information element in the second information set and a transmitter of the first information element do not share a same baseband unit.

In one embodiment, the first radio signal is transmitted on a PSCCH.

In one embodiment, the first radio signal is transmitted on a PSSCH.

In one embodiment, the first radio signal is transmitted on an Uplink Shared Channel (UL-SCH).

In one embodiment, the first radio signal is transmitted on a Physical Uplink Shared Channel (PUSCH).

In one embodiment, the first radio signal is transmitted on a Physical Uplink Control Channel (PUCCH).

In one embodiment, the first radio signal is transmitted on a PUCCH and a PUSCH.

In one embodiment, the first radio signal is transmitted on a PSCCH and a PSSCH.

In one embodiment, the first radio signal is cell-specific.

In one embodiment, the first radio signal is UE-specific.

In one embodiment, the first radio signal is transmitted via broadcast.

In one embodiment, the first radio signal is transmitted via groupcast.

In one embodiment, the first radio signal is transmitted via unicast.

In one embodiment, the first radio signal comprises all or part of a higher layer signaling.

In one embodiment, the first radio signal comprises all or part of an RRC layer signaling.

In one embodiment, the first radio signal comprises one or more fields of an RRC IE.

In one embodiment, the first radio signal comprises all or part of a MAC layer signaling.

In one embodiment, the first radio signal comprises one or more fields of a MAC CE.

In one embodiment, the first radio signal comprises one or more fields of a PHY layer.

In one embodiment, the first radio signal comprises one or more fields of a piece of SCI.

In one embodiment, the first radio signal does not comprise SCI.

In one embodiment, the first radio signal comprises one or more fields of a piece of Uplink Control Information (UCI).

In one embodiment, the first radio signal does not comprise UCI.

In one embodiment, the first radio signal includes Reference Signal (RS).

In one embodiment, the first radio signal does not include RS.

In one embodiment, the first radio signal includes Demodulation Reference Signal (DMRS).

In one embodiment, the first radio signal does not include DMRS.

In one embodiment, the first radio signal comprises a first bit block. The first bit block comprises a positive integer number of sequentially arranged bits.

In one embodiment, the first bit block comprises a positive integer number of Code Blocks (CB).

In one embodiment, the first bit block comprises a positive integer number of Code Block Groups (CBG).

In one embodiment, the first bit block comprises a Transport Block (TB).

In one embodiment, the first bit block is acquired after a TB is subjected to TB-level Cyclic Redundancy Check (CRC) Attachment.

In one embodiment, the first bit block is a CB of CBs acquired after a TB is sequentially subjected to TB-level CRC Attachment, Code Block segmentation and CB-level CRC Attachment.

In one embodiment, all or part of bits of the first bit block are sequentially subjected to TB-level CRC Attachment, Code Block Segmentation, CB-level CRC Attachment, Channel Coding, Rate Matching, Code Block Concatenation, scrambling, Modulation, Layer Mapping, Antenna Port Mapping, Mapping to Physical Resource Blocks, Baseband Signal Generation, and Modulation and Upconversion to generate the first radio signal.

In one embodiment, the channel coding is based on a polar code.

In one embodiment, the channel coding is based on a Low-density Parity-Check (LDPC) code.

In one embodiment, only the first bit block is used for generating the first radio signal.

In one embodiment, bit block(s) other than the first bit block is(are) used for generating the first radio signal.

In one embodiment, a subcarrier spacing (SCS) of sub-carriers occupied by the first radio signal in frequency domain is one of 15 kHz, 30 kHz, 60 kHz, 120 kHz, 240 kHz, 480 kHz and 960 kHz.

In one embodiment, the number of multicarrier symbol(s) comprised by the first radio signal in time domain is one of 1, 2, 3, 4, 5, 6, 7, 11, 12, 13 and 14.

In one embodiment, target receiver(s) of the first radio signal includes(include) a positive integer number of communication node(s), a transmitter of the first information element is one of the positive integer number of communication node(s) included by the target receiver(s) of the first radio signal.

In one embodiment, target receiver(s) of the first radio signal includes(include) a positive integer number of UE(s), a transmitter of the first information element is one of the positive integer number of UE(s) included by the target receiver(s) of the first radio signal.

In one embodiment, the transmitter of the first information element belongs to target receiver(s) of the first radio signal.

In one embodiment, target receiver(s) of the first radio signal includes(include) the transmitter of the first information element.

In one embodiment, a target receiver of the first radio signal is a transmitter of the first information element.

In one embodiment, target receiver(s) of the first radio signal and a transmitter of the first information element are co-located.

In one embodiment, a target receiver of the first radio signal and a transmitter of the first information element are a same UE.

In one embodiment, a backhaul link between a target receiver of the first radio signal and a transmitter of the first information element is ideal (i.e., the latency is ignorable).

In one embodiment, a target receiver of the first radio signal and a transmitter of the first information element share a same baseband unit.

In one embodiment, the second information set is not transmitted by any target receiver of the first radio signal.

In one embodiment, a transmitter of the second information set does not include any target receiver of the first radio signal.

In one embodiment, none of target receiver(s) of the first radio signal belongs to the transmitter of the second information set.

In one embodiment, a transmitter of any second-type information element in the second information set and a target receiver of the first radio signal are non-co-located.

In one embodiment, a transmitter of any second-type information element in the second information set and a target receiver of the first radio signal are two different communication nodes.

In one embodiment, a transmitter of any second-type information element in the second information set and a target receiver of the first radio signal are two different UEs.

In one embodiment, a backhaul link between a transmitter of any second-type information element in the second information set and a target receiver of the first radio signal is not ideal (i.e., the latency is non-ignorable).

In one embodiment, a transmitter of any second-type information element in the second information set and a target receiver of the first radio signal do not share a same baseband unit.

In one embodiment, the first power value is a transmitting power of the first radio signal.

In one embodiment, the first power value is a transmitting power of the first node when transmitting the first radio signal within a first timing for transmission.

In one subembodiment, the first power value is for a first carrier in a first serving cell, the first radio signal is transmitted on the first carrier in the first serving cell.

In one embodiment, the first timing for transmission comprises a positive integer number of time domain resource element(s).

In one embodiment, the first power value is measured by dBm.

In one embodiment, the first power value is measured by mW.

In one embodiment, the first power value is related to a smaller value between the first reference power value and the second limit power value.

In one embodiment, a smaller value between the first reference power value and the second limit power value is used for determining the first power value.

In one embodiment, when the first reference power value is less than the second limit power value, the first power value is related to the first reference power value.

In one embodiment, when the first reference power value is greater than the second limit power value, the first power value is related to the second limit power value.

In one embodiment, when the first reference power value is equal to the second limit power value, the first power value is related to the first reference power value.

In one embodiment, when the first reference power value is equal to the second limit power value, the first power value is related to the second limit power value.

In one embodiment, the first power value is related to a first smaller value, the first smaller value is a smaller value between the first reference power value and the second limit power value.

In one embodiment, the first smaller value is used for determining the first power value.

In one embodiment, when the first reference power value is less than the second limit power value, the first smaller value is the first reference power value.

In one embodiment, when the first reference power value is greater than the second limit power value, the first smaller value is the second limit power value.

In one embodiment, when the first reference power value is equal to the second limit power value, the first smaller value is the first reference power value.

In one embodiment, when the first reference power value is equal to the second limit power value, the first smaller value is the second limit power value.

In one embodiment, the first power value is linearly correlated to the first smaller value.

In one embodiment, the first power value is in direct proportion to the first smaller value.

In one embodiment, a linear combination of the first smaller value and the first power compensation is used for determining the first power value.

In one embodiment, the first power value is linearly correlated to a linear combination of the first smaller value and the first power compensation.

In one embodiment, the first power value is in direct proportion to a linear combination of the first smaller value and the first power compensation.

In one embodiment, the first power value is equal to a linear combination of the first smaller value and the first power compensation.

In one embodiment, the first power value is related to all of the first smaller value, the first power compensation, a first bandwidth, a first transmission format adjustment value and a first power adjustment value.

In one embodiment, the first smaller value, the first power compensation, the first bandwidth, the first transmission format adjustment value and the first power adjustment value are all used for determining the first power value.

In one embodiment, a linear combination of the first smaller value, the first power compensation, the first bandwidth, the first transmission format adjustment value and the first power adjustment value is used for determining the first power value.

In one embodiment, the first power value is linearly correlated to one of the first smaller value, the first power compensation, the first bandwidth, the first transmission format adjustment value and the first power adjustment value.

In one embodiment, the first power value is linearly correlated to a sum of the first smaller value, the first power compensation, the first bandwidth, the first transmission format adjustment value and the first power adjustment value.

In one embodiment, the first power value is in direct proportion to one of the first smaller value, the first power compensation, the first bandwidth, the first transmission format adjustment value and the first power adjustment value.

In one embodiment, the first power value is equal to a sum of the first smaller value, the first power compensation, the first bandwidth, the first transmission format adjustment value and the first power adjustment value.

In one embodiment, the first bandwidth is related to frequency domain resources occupied by the first radio signal.

In one embodiment, the first bandwidth is frequency domain resources occupied by the first radio signal.

In one embodiment, the first bandwidth is a number of Resource Blocks (RBs) occupied by the first radio signal.

In one embodiment, the first bandwidth is related to the number of RBs occupied by the first radio signal and an SCS of the first radio signal.

In one embodiment, the first bandwidth is a logarithm value.

In one embodiment, the first bandwidth is a linear value.

In one embodiment, the first transmission format adjustment value is related to a Modulation Coding Scheme (MCS) employed by the first radio signal.

In one embodiment, the first transmission format adjustment value is related to a transmission format of the first radio signal.

In one embodiment, the first transmission format adjustment value is related to a number of information bits in a RB.

In one embodiment, the first transmission format adjustment value is configured by a higher layer signaling.

In one embodiment, a higher layer signaling is used for determining the first transmission format adjustment value.

In one embodiment, the first power adjustment value is dynamically configured.

In one embodiment, the first power adjustment value is configured through Transmitter Power Control Command (TPC Command).

In one embodiment, the first power adjustment value is configured through DCI.

In one embodiment, the first power adjustment value is configured through SCI.

Embodiment 2

Figure 2:
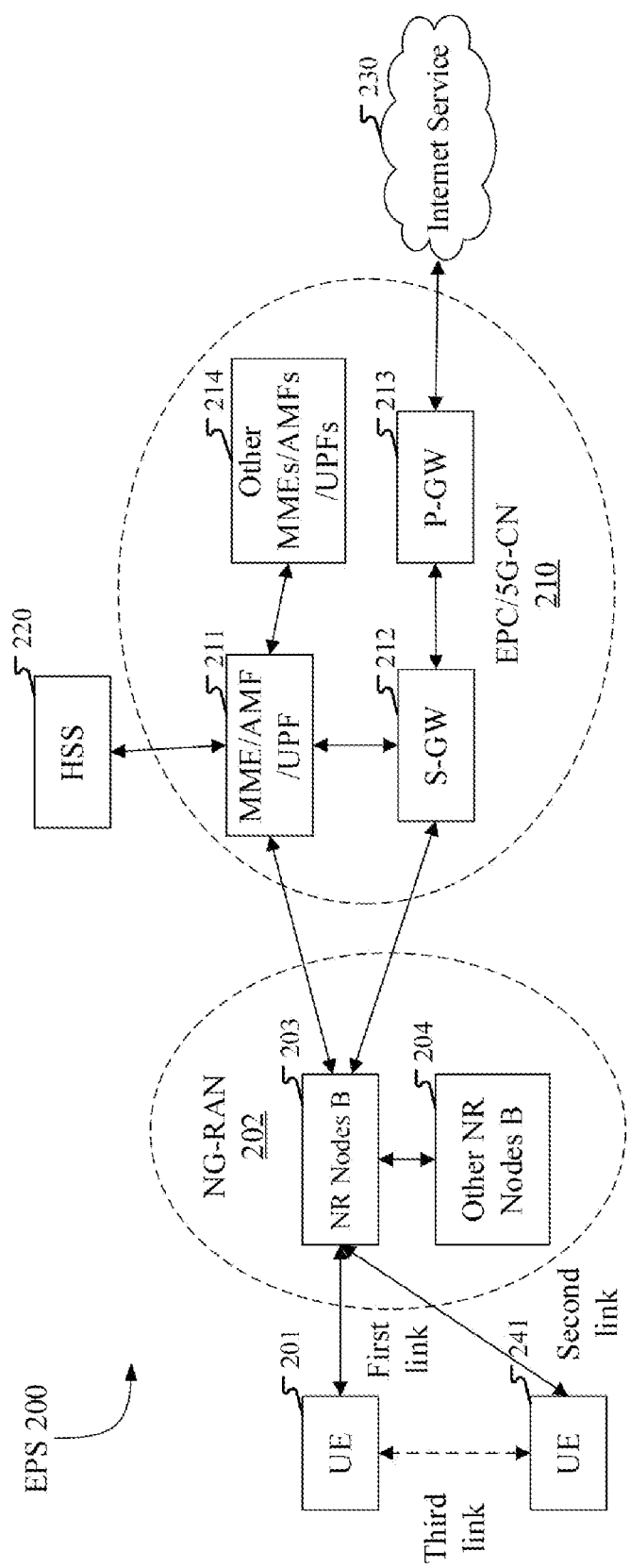
FIG. 2 illustrates a schematic diagram of network architecture according to one embodiment of the present disclosure.

Embodiment 2 illustrates a schematic diagram of a network architecture, as shown in FIG. 2.

FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200 or other appropriate term. The EPS 200 may comprise one or more UEs 201, an NG-RAN 202, an Evolved Packet Core/5G-CoreNetwork (EPC/5G-CN) 210, a Home Subscriber Server (HSS) 220 and an Internet Service 230. The EPS 200 may be interconnected with other access networks.

For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, communication units in automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the EPC/5G-CN 210 via an S1/NG interface. The EPC/5G-CN 210 comprises a Mobility Management Entity (MME)/Authentication Management Field (AMF)/User Plane Function(UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212; the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming Services.

In one embodiment, the first node in the present disclosure includes the UE 201.

In one embodiment, the second node in the present disclosure includes the UE 241.

In one embodiment, the second node in the present disclosure includes the gNB 203.

In one embodiment, the third node in the present disclosure includes the UE 241.

In one embodiment, the third node in the present disclosure includes the gNB 203.

In one embodiment, the UE in the present disclosure includes the UE 201.

In one embodiment, the base station in the present disclosure includes the gNB 203.

In one embodiment, the UE 201 supports sidelink transmissions.

In one embodiment, the UE 201 supports a PC 5 interface.

In one embodiment, the UE 201 supports a Uu interface.

In one embodiment, the UE 241 supports sidelink transmissions.

In one embodiment, the UE 241 supports a PC 5 interface.

In one embodiment, the UE 241 supports a Uu interface.

In one embodiment, the gNB 203 supports a Uu interface.

In one embodiment, a receiver of the first information element in the present disclosure includes the UE 201.

In one embodiment, a transmitter of the first information element in the present disclosure includes the UE 241.

In one embodiment, a transmitter of the first information element in the present disclosure includes the gNB 203.

In one embodiment, a receiver of the second information set in the present disclosure includes the UE 201.

In one embodiment, a transmitter of the second information set in the present disclosure includes the UE 241.

In one embodiment, a transmitter of the second information set in the present disclosure includes the gNB 203.

In one embodiment, a receiver of the second information element in the present disclosure includes the UE 201.

In one embodiment, a transmitter of the second information element in the present disclosure includes the UE 241.

In one embodiment, a transmitter of the second information element in the present disclosure includes the gNB 203.

In one embodiment, a receiver of the first target radio signal in the present disclosure includes the UE 201.

In one embodiment, a transmitter of the first target radio signal in the present disclosure includes the UE 241.

In one embodiment, a transmitter of the first target radio signal in the present disclosure includes the gNB 203.

In one embodiment, a receiver of the second target signal set in the present disclosure includes the UE 201.

In one embodiment, a transmitter of the first target signal set in the present disclosure includes the UE 241.

In one embodiment, a transmitter of the first target signal set in the present disclosure includes the gNB 203.

In one embodiment, a transmitter of the first radio signal in the present disclosure includes the UE 201.

In one embodiment, a receiver of the first radio signal in the present disclosure includes the UE 241.

In one embodiment, a receiver of the first radio signal in the present disclosure includes the gNB 203.

In one embodiment, a transmitter of the second radio signal in the present disclosure includes the UE 201.

In one embodiment, a receiver of the second radio signal in the present disclosure includes the UE 241.

In one embodiment, a receiver of the second radio signal in the present disclosure includes the gNB 203.

Embodiment 3

Figure 3:
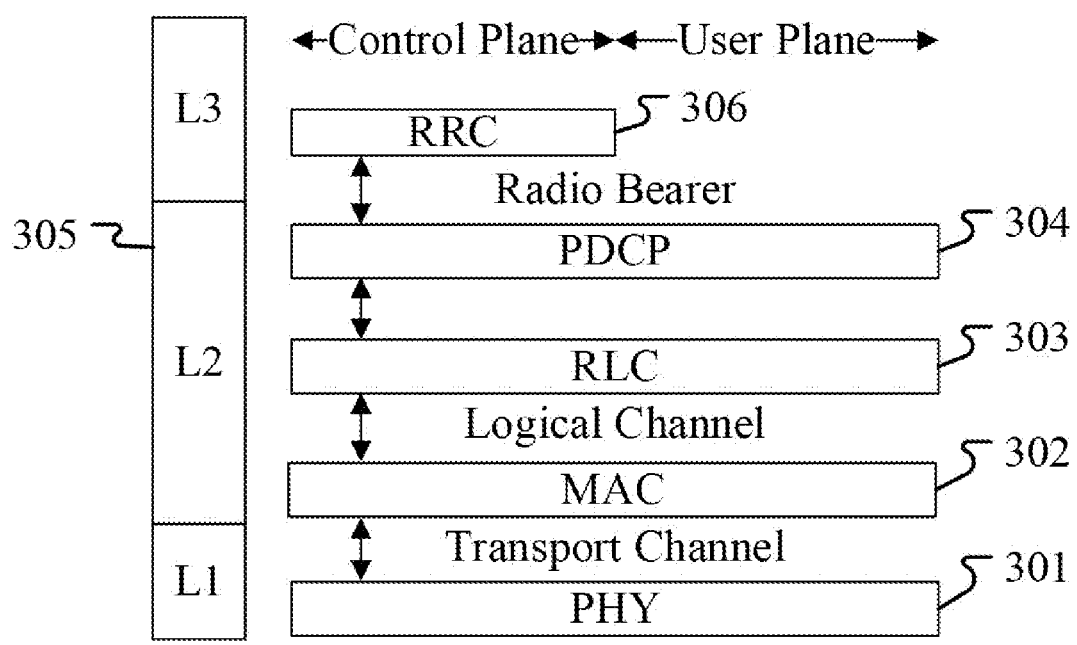
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

FIG. 3 is a schematic diagram illustrating a radio protocol architecture of a user plane and a control plane. In FIG. 3, the radio protocol architecture for a UE and a base station (gNB, or eNB) is represented by three layers, which are a layer 1, a layer 2 and a layer 3, respectively. The layer 1 (L1) is the lowest layer and performs signal processing functions of various PHY layers. Layers above the L1 layer are higher layers. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base station of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for first communication node handover between second communication nodes. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the first communication node and the second communication node is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the base station and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information element in the present disclosure is generated by the RRC sublayer 306.

In one embodiment, the first information element in the present disclosure is transmitted from the MAC sublayer 302 to the PHY 301.

In one embodiment, the first information element in the present disclosure is generated by the PHY 301.

In one embodiment, the second information element in the present disclosure is generated by the RRC sublayer 306.

In one embodiment, the second information element in the present disclosure is transmitted from the MAC sublayer 302 to the PHY 301.

In one embodiment, the second information element in the present disclosure is generated by the PHY 301.

In one embodiment, any second-type information element of the second information set in the present disclosure is generated by the RRC sublayer 306.

In one embodiment, any second-type information element of the second information set in the present disclosure is transmitted from the MAC sublayer 302 to the PHY 301.

In one embodiment, any second-type information element of the second information set in the present disclosure is generated by the PHY 301.

In one embodiment, the first target radio signal in the present disclosure is generated by the PHY 301.

In one embodiment, the second target radio signal in the present disclosure is generated by the PHY 301.

In one embodiment, any signal of the second target signal set in the present disclosure is generated by the PHY 301.

In one embodiment, the first radio signal in the present disclosure is generated by the PHY 301.

In one embodiment, the second radio signal in the present disclosure is generated by the PHY 301.

Embodiment 4

Figure 4:
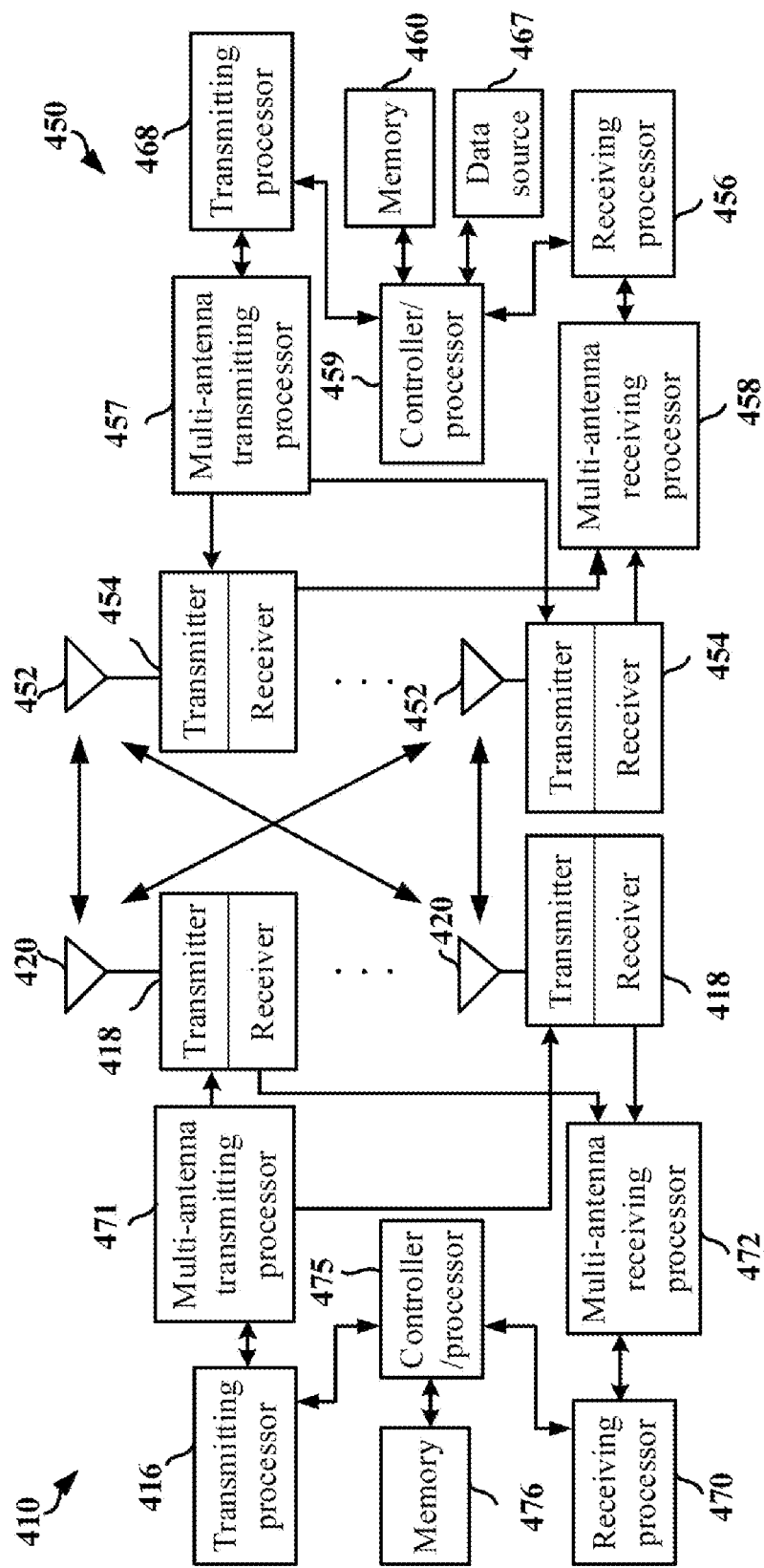
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the first communication device 410, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a base station.

In one subembodiment, the first node is a UE, and the second node is a relay node.

In one subembodiment, the first node is a relay node, and the second node is a base station.

In one subembodiment, the second communication device 450 comprises at least one controller/processor; the at least one controller/processor is in charge of HARQ operation.

In one subembodiment, the first communication device 410 comprises at least one controller/processor; the at least one controller/processor is in charge of HARQ operation.

In one subembodiment, the first communication device 410 comprises at least one controller/processor; the at least one controller/processor implements ACK and/or NACK protocols to perform error detection as a way to support HARQ operation.

In one embodiment, the first node in the present disclosure comprises the second communication device 450, and the third node in the present disclosure comprises the first communication device 410.

In one subembodiment, the first node is a UE, and the third node is a UE.

In one subembodiment, the first node is a UE, and the third node is a base station.

In one subembodiment, the first node is a UE, and the third node is a relay node.

In one subembodiment, the first node is a relay node, and the third node is a base station.

In one subembodiment, the second communication device 450 comprises at least one controller/processor; the at least one controller/processor is in charge of HARQ operation.

In one subembodiment, the first communication device 410 comprises at least one controller/processor; the at least one controller/processor is in charge of HARQ operation.

In one subembodiment, the first communication device 410 comprises at least one controller/processor; the at least one controller/processor implements ACK and/or NACK protocols to perform error detection as a way to support HARQ operation.

In one embodiment, the second communication device 450 comprises at least one processor and at least one memory. The at least one memory includes computer program codes.

The at least one memory and the computer program codes are configured to be used in collaboration with the at least one processor. The second communication device 450 at least receives a first information element, the first information element being used for indicating a first reference power value; receives a second information set, the second information set comprising a second information element, the second information element being used for indicating a second limit power value; and transmits a first radio signal with a first power value; a target receiver of the first radio signal includes a transmitter of the first information element, the first power value is related to a smaller value between the first reference power value and the second limit power value.

In one subembodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes: receiving a first information element, the first information element being used for indicating a first reference power value; receiving a second information set, the second information set comprising a second information element, the second information element being used for indicating a second limit power value; and transmitting a first radio signal with a first power value; a target receiver of the first radio signal includes a transmitter of the first information element, the first power value is related to a smaller value between the first reference power value and the second limit power value.

In one subembodiment, the second communication device 450 corresponds to the first node in the present disclosure.

In one embodiment, the first communication device 410 comprises at least one processor and at least one memory. The at least one memory includes computer program codes.

The at least one memory and the computer program codes are configured to be used in collaboration with the at least one processor. The second communication device 410 at least transmits a first information element, the first information element being used for indicating a first reference power value; and receives a first radio signal; a first power value is a transmitting power of the first radio signal, the first power value is related to a smaller value between the first reference power value and a second limit power value, the second limit power value is indicated by second information element, the second information element belongs to a second information set, a target receiver of the second information set includes a transmitter of the first radio signal.

In one subembodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes: transmitting a first information element, the first information element being used for indicating a first reference power value; and receiving a first radio signal; a first power value is a transmitting power of the first radio signal, the first power value is related to a smaller value between the first reference power value and a second limit power value, the second limit power value is indicated by second information element, the second information element belongs to a second information set, a target receiver of the second information set includes a transmitter of the first radio signal.

In one subembodiment, the first communication device 410 corresponds to the second node in the present disclosure.

In one embodiment, the first communication device 410 comprises at least one processor and at least one memory. The at least one memory includes computer program codes.

The at least one memory and the computer program codes are configured to be used in collaboration with the at least one processor. The first communication device 410 at least transmits a second information element, the second information element belonging to a second information set, and the second information element being used for indicating a second limit power value; a first reference power value is indicated by a first information element, a first power value is a transmitting power of the first radio signal, the first power value is related to a smaller value between the first reference power value and the second limit power value, a target receiver of the second information set includes a transmitter of the first radio signal, and a target receiver of the first radio signal does not include the third node.

In one subembodiment, the first communication device 410 corresponds to the third node in the present disclosure.

In one embodiment, the first communication device 410 comprises a memory that stores a computer readable instruction program. The computer readable instruction program generates an action when executed by at least one processor.

The action includes: transmitting a second information element, the second information element belonging to a second information set, and the second information element being used for indicating a second limit power value; a first reference power value is indicated by a first information element, a first power value is a transmitting power of the first radio signal, the first power value is related to a smaller value between the first reference power value and the second limit power value, a target receiver of the second information set includes a transmitter of the first radio signal, and a target receiver of the first radio signal does not include the third node.

In one subembodiment, the first communication device 410 corresponds to the third node in the present disclosure.

In one embodiment, at least one of the antenna 452, the receiver 454, the multi-antenna receiving processor 458, the receiving processor 456, the controller/processor 459, the memory 460 or the data source 467 is used in the present disclosure for receiving the first information element.

In one embodiment, at least one of the antenna 452, the receiver 454, the multi-antenna receiving processor 458, the receiving processor 456, the controller/processor 459, the memory 460 or the data source 467 is used in the present disclosure for receiving the second information set.

In one embodiment, at least one of the antenna 452, the receiver 454, the multi-antenna receiving processor 458, the receiving processor 456, the controller/processor 459, the memory 460 or the data source 467 is used in the present disclosure for receiving the second information element.

In one embodiment, at least one of the antenna 452, the receiver 454, the multi-antenna receiving processor 458, the receiving processor 456, the controller/processor 459, the memory 460 or the data source 467 is used in the present disclosure for receiving the first target radio signal.

In one embodiment, at least one of the antenna 452, the receiver 454, the multi-antenna receiving processor 458, the receiving processor 456, the controller/processor 459, the memory 460 or the data source 467 is used in the present disclosure for receiving the second target signal set.

In one embodiment, at least one of the antenna 452, the receiver 454, the multi-antenna receiving processor 458, the receiving processor 456, the controller/processor 459, the memory 460 or the data source 467 is used in the present disclosure for receiving the second target radio signal.

In one embodiment, at least one of the antenna 452, the transmitter 454, the multi-antenna transmitting processor 458, the transmitting processor 468, the controller/processor 459, the memory 460 or the data source 467 is used in the present disclosure for transmitting the first radio signal with the first power value.

In one embodiment, at least one of the antenna 452, the transmitter 454, the multi-antenna transmitting processor 458, the transmitting processor 468, the controller/processor 459, the memory 460 or the data source 467 is used in the present disclosure for transmitting the second radio signal with the second power value.

In one embodiment, at least one of the antenna 420, the transmitter 418, the multi-antenna transmitting processor 471, the transmitting processor 416, the controller/processor 475 or the memory 476 is used in the present disclosure for transmitting the first information element.

In one embodiment, at least one of the antenna 420, the transmitter 418, the multi-antenna transmitting processor 471, the transmitting processor 416, the controller/processor 475 or the memory 476 is used in the present disclosure for transmitting any second-type information element of the second information set.

In one embodiment, at least one of the antenna 420, the transmitter 418, the multi-antenna transmitting processor 471, the transmitting processor 416, the controller/processor 475 or the memory 476 is used in the present disclosure for transmitting the second information element.

In one embodiment, at least one of the antenna 420, the transmitter 418, the multi-antenna transmitting processor 471, the transmitting processor 416, the controller/processor 475 or the memory 476 is used in the present disclosure for transmitting the first target radio signal.

In one embodiment, at least one of the antenna 420, the transmitter 418, the multi-antenna transmitting processor 471, the transmitting processor 416, the controller/processor 475 or the memory 476 is used in the present disclosure for transmitting any signal of the second target signal set.

In one embodiment, at least one of the antenna 420, the transmitter 418, the multi-antenna transmitting processor 471, the transmitting processor 416, the controller/processor 475 or the memory 476 is used in the present disclosure for transmitting the second target radio signal.

In one embodiment, at least one of the antenna 420, the receiver 418, the multi-antenna receiving processor 472, the receiving processor 470, the controller/processor 475 or the memory 476 is used in the present disclosure for receiving the first radio signal.

In one embodiment, at least one of the antenna 420, the receiver 418, the multi-antenna receiving processor 472, the receiving processor 470, the controller/processor 475 or the memory 476 is used in the present disclosure for receiving the second radio signal.

Embodiment 5

Figure 5:
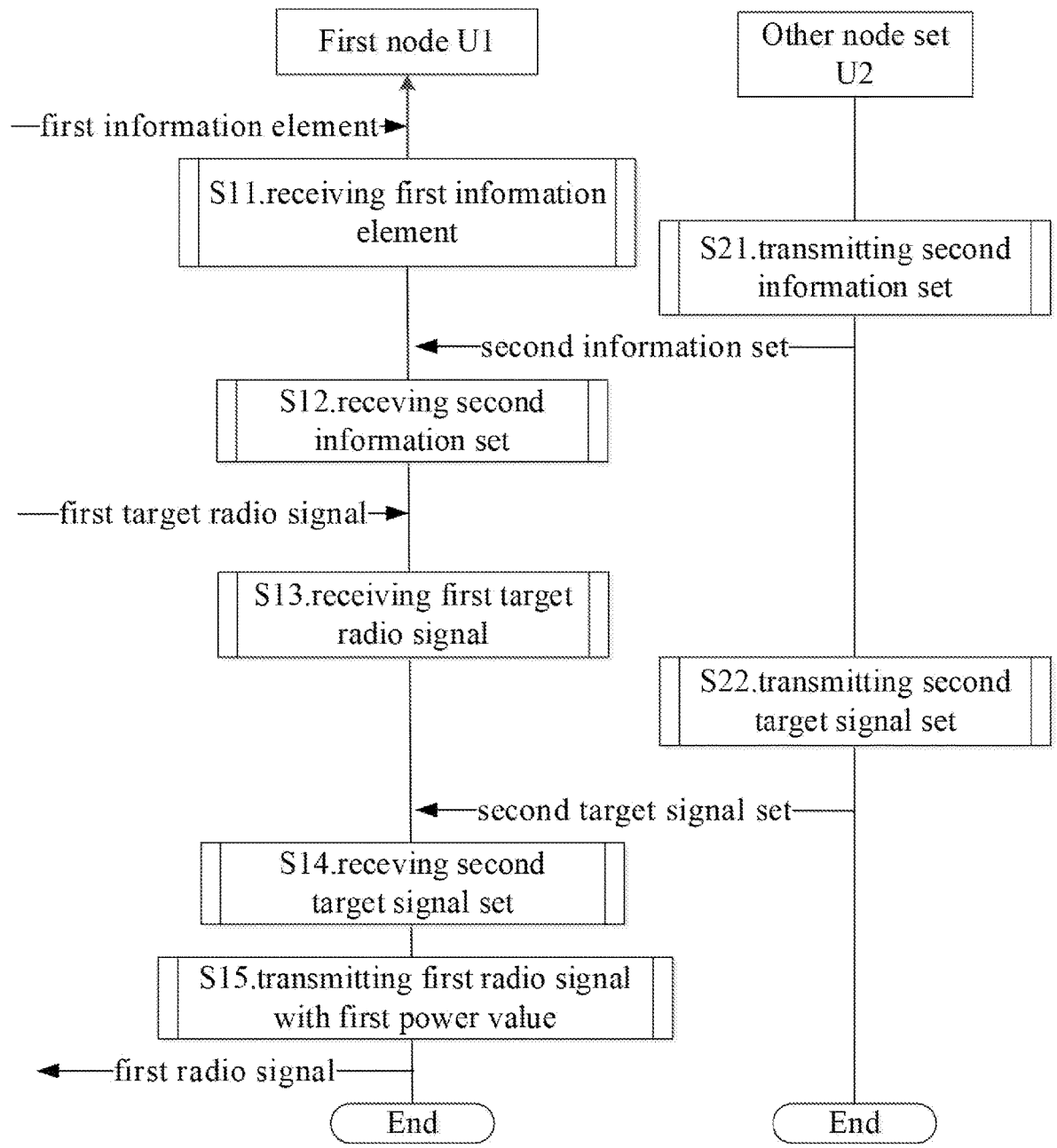
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a first node U1 and other node set U2 are in communication with one another through an air interface.

The first node U1 receives a first information element in step S11; receives a second information set in step S12; receives a first target radio signal in step S13; receives a second target signal set in step S14; and transmits a first radio signal with a first power value in step S15.

The other node set U2 transmits a second information set in step S21; and transmits a second target signal set in step S22.

In Embodiment 5, the first information element is used for indicating a first reference power value; the second information set comprises a second information element, the second information element being used for indicating a second limit power value; a target receiver of the first radio signal includes a transmitter of the first information element, the first power value is related to a smaller value between the first reference power value and the second limit power value; the first target radio signal is used by the first node U1 for determining a first power compensation; the second target signal set comprises a second target radio signal, the second target radio signal being used by the first node U1 for determining a second power compensation; a transmitter of the first target radio signal and a transmitter of the first information element are co-located; the second limit power value is related to the first power compensation and the second power compensation; the first information element indicates a first coefficient, the second limit power value is linearly correlated to the first coefficient; the second information set comprises Q second-type information elements, the second information element is one of the Q second-type information elements, the Q second-type information elements are respectively used for indicating Q limit power values, the second limit power value is a smallest value of the Q limit power values; the first power value is a smaller value between a maximum transmitting power value and a first candidate power value, the first candidate power value is linearly correlated with a smaller value between the first reference power value and the second limit power value, with a correlation coefficient being 1.

In one embodiment, the other node set comprises a positive integer number of communication node(s).

In one subembodiment, at least one of the positive integer number of communication node(s) is a UE.

In one subembodiment, at least one of the positive integer number of communication node(s) is a base station.

In one subembodiment, at least one of the positive integer number of communication node(s) is a relay node.

In one subembodiment, any communication node of the positive integer number of communication node(s) is a UE.

In one subembodiment, any communication node of the positive integer number of communication node(s) is a base station.

In one subembodiment, any communication node of the positive integer number of communication node(s) is a relay node.

In one embodiment, the other node set comprises only one communication node.

In one subembodiment, the one communication node is a UE.

In one subembodiment, the one communication node is a base station.

In one subembodiment, the one communication node is a relay node.

In one embodiment, a target receiver of the second information set includes the first node U1.

In one embodiment, a transmitter of the first radio signal includes the first node U1.

In one embodiment, a target receiver of the second information set is the first node U1, and a transmitter of the first radio signal is the first node U1.

In one embodiment, a target receiver of the second target signal set includes the first node U1.

In one embodiment, a target receiver of the first target radio signal includes the first node U1.

In one embodiment, a target receiver of the second target signal set is the first node U1, and a target receiver of the first target radio signal is the first node U1.

In one embodiment, the first power value is related to a smaller value between a maximum transmitting power value and a first candidate power value.

In one embodiment, the first power value is the smaller value between the maximum transmitting power value and the first candidate power value.

In one embodiment, the maximum transmitting power value refers to a greatest transmitting power of the first node allowed to be configured in the first timing.

In one embodiment, the maximum transmitting power value refers to a greatest transmitting power of the first node that can be used for transmission in the first timing.

In one subembodiment of the above embodiment, the maximum transmitting power value is used for a radio signal transmitted by the first node on the first carrier within the first serving cell.

In one embodiment, the first power value is determined by the following formula:

$$P_1 = \min\{P_{CMAX}, \tilde{P}_1\}$$

In one embodiment, the $P_1$ is the first power value.

In one embodiment, the $P_{CMAX}$ is the maximum transmitting power value.

In one embodiment, the $\tilde{P}_1$ is the first candidate power value.

In one embodiment, the first candidate power value is related to a smaller value between the first reference power value and the second limit power value.

In one embodiment, a smaller value between the first reference power value and the second limit power value is used for determining the first candidate power value.

In one embodiment, when the first reference power value is smaller than the second limit power value, the first candidate power value is linearly correlated to the first reference power value.

In one embodiment, when the first reference power value is greater than the second limit power value, the first candidate power value is linearly correlated to the second limit power value.

In one embodiment, when the first reference power value is equal to the second limit power value, the first candidate power value is linearly correlated to the first reference power value.

In one embodiment, when the first reference power value is equal to the second limit power value, the first candidate power value is linearly correlated to the second limit power value.

In one embodiment, the linear correlation coefficient between the first candidate power value and the first reference power value is 1.

In one embodiment, the linear correlation coefficient between the first candidate power value and the second limit power value is 1.

In one embodiment, the first candidate power value is linearly correlated to the smaller value between the first reference power value and the second limit power value, with the correlation coefficient being 1.

In one embodiment, the first candidate power value is related to the first smaller value, the first smaller value is a smaller value between the first reference power value and the second limit power value.

In one embodiment, the first smaller value is used for determining the first candidate power value.

In one embodiment, the first candidate power value is linearly correlated to the first smaller value, with the correlation coefficient being 1.

In one embodiment, the first candidate power value is in direct proportion to the first smaller value.

In one embodiment, a linear combination of the first smaller value and the first power compensation is used for determining the first candidate power value.

In one embodiment, the first candidate power value is linearly correlated to a linear combination of the first smaller value and the first power compensation, with the correlation coefficient being 1.

In one embodiment, the first candidate power value is in direct proportion to a linear combination of the first smaller value and the first power compensation.

In one embodiment, the first candidate power value is equal to a linear combination of the first smaller value and the first power compensation.

In one embodiment, the first candidate power value is related to all of the first smaller value, the first power compensation, the first bandwidth, the first transmission format adjustment value and the first power adjustment value.

In one embodiment, the first smaller value, the first power compensation, the first bandwidth, the first transmission format adjustment value and the first power adjustment value are all used for determining the first candidate power value.

In one embodiment, a linear combination of the first smaller value, the first power compensation, the first bandwidth, the first transmission format adjustment value and the first power adjustment value is used for determining the first candidate power value.

In one embodiment, the first candidate power value is linearly correlated to one of the first smaller value, the first power compensation, the first bandwidth, the first transmission format adjustment value and the first power adjustment value, with the correlation coefficient being 1.

In one embodiment, the first candidate power value is linearly correlated to a sum of the first smaller value, the first power compensation, the first bandwidth, the first transmission format adjustment value and the first power adjustment value, with the correlation coefficient being 1.

In one embodiment, the first candidate power value is in direct proportion to a sum of the first smaller value, the first power compensation, the first bandwidth, the first transmission format adjustment value and the first power adjustment value.

In one embodiment, the first candidate power value is equal to a sum of the first smaller value, the first power compensation, the first bandwidth, the first transmission format adjustment value and the first power adjustment value.

In one embodiment, the first candidate power value is determined by the following formula:

$$\tilde{P}_1 = \min\{P_O(1), P_{limit}(2)\} + 10 \log_{10}(2^\mu \cdot M_{RB}) + \alpha_1 \cdot PL_1 + \Delta_{TF} + f(l)$$

In one embodiment, the $\tilde{P}_1$ is the first candidate power value.

In one embodiment, the $P_O(1)$ is the first reference power value.

In one embodiment, the $P_{limit}(2)$ is the second limit power value.

In one embodiment, the $10 \log_{10}(2^\mu \cdot M_{RB})$ is a logarithm of the first bandwidth; the $M_{RB}$ is a number of RBs occupied by the first radio signal; the $\mu$ is SCS configuration of the first radio signal, wherein the p is a non-negative integer out of 0, 1, 2, 3 and 4.

In one embodiment, the $\alpha_1 \cdot PL_1$ is the first power compensation; the $\alpha_1$ is the first coefficient; the $PL_1$ is the first pathloss.

In one embodiment, the ai is equal to 1.

In one embodiment, the $\Delta_{TF}$ is the first transmission format adjustment value.

In one embodiment, the f(l) is the first power adjustment value.

In one embodiment, the first power value is determined by the following formula:

$$P_1 = \min\{P_{CMAX}, \min[P_O(1), P_{limit}(2)] + 10 \log_{10}(2^\mu \cdot M_{RB}) + \alpha_1 \cdot PL_1 + \Delta_{TF} + f(l)\}$$

Embodiment 6

Figure 6:
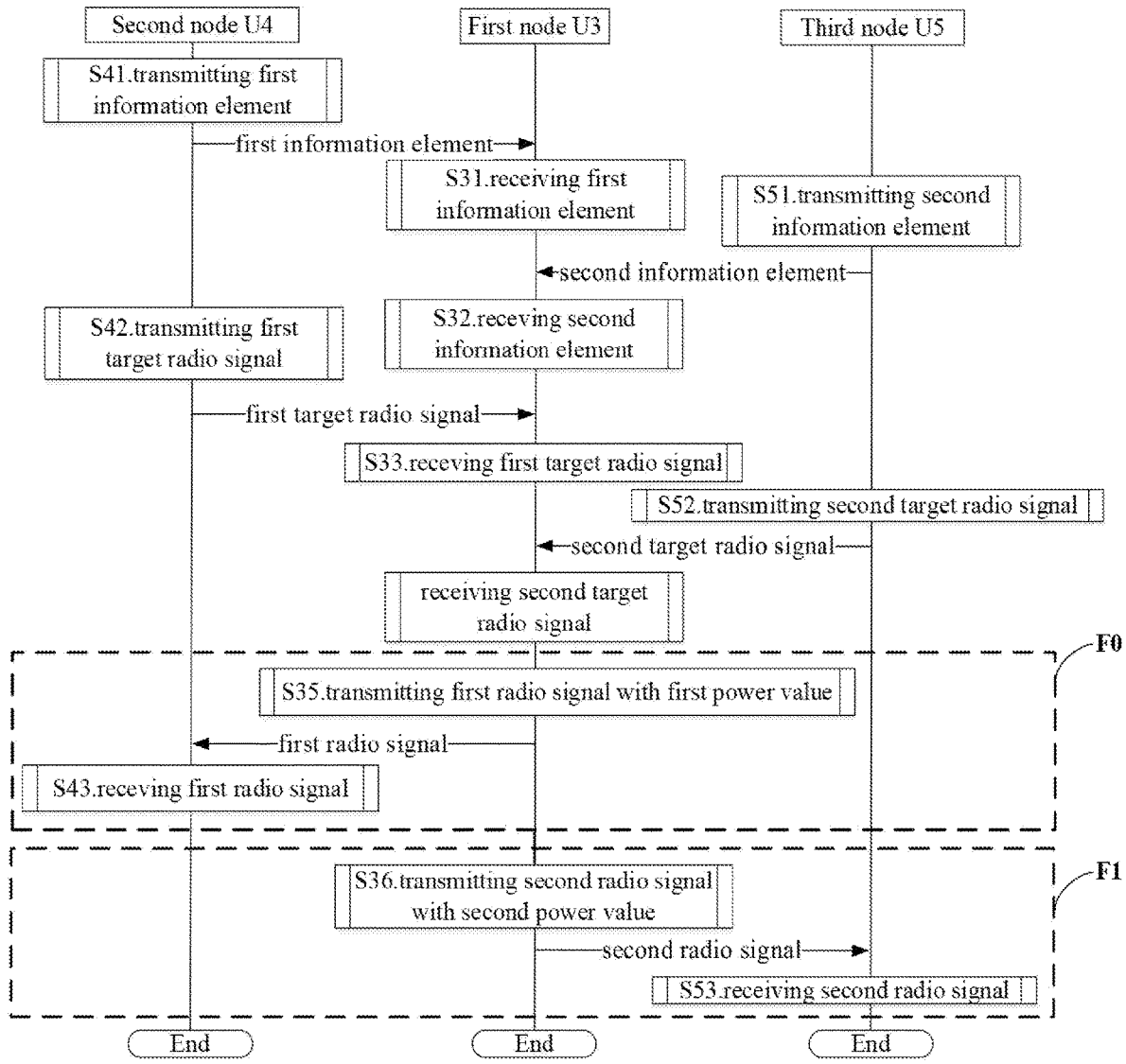
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a first node U3 and a second node U4 are in communication with each other through an air interface, and the first node U3 and a third node U5 are in communication with each other through an air interface, too. In FIG. 6, steps in broken lined boxes F0 and F1 are optional, respectively.

The first node U3 receives a first information element in step S31; receives a second information element in step S32; receives a first target radio signal in step S33; receives a second target radio signal in step S34; transmits a first radio signal with a first power value in step S35; and transmits a second radio signal with a second power value in step S36.

The second node U4 transmits a first information element in step S41; transmits a first target radio signal in step S42; and receives a first radio signal in step S43.

The third node U5 transmits a second information element in step S51; transmits a second target radio signal in step S52; and receives a second radio signal in step S53.

In Embodiment 6, the first target radio signal is used by the first node U3 for determining a first power compensation; the second target radio signal is used by the first node U3 for determining a second power compensation.

In one embodiment, the third node U5 belongs to the other node set.

In one embodiment, the positive integer number of communication node(s) of the other node set includes(include) the third node U5.

In one embodiment, the second node U4 does not belong to the other node set.

In one embodiment, the positive integer number of communication node(s) of the other node set does(do) not comprise the second node U4.

In one embodiment, a transmitter of the first information element includes the second node U4.

In one embodiment, a transmitter of the first target radio signal includes the second node U4.

In one embodiment, a target receiver of the radio signal includes the second node U4.

In one embodiment, a transmitter of the first target radio signal is the second node U4, and a transmitter of the first information element is the second node U4.

In one embodiment, a target receiver of the first radio signal is the second node U4, and a transmitter of the first information element is the second node U4.

In one embodiment, a transmitter of the second information element includes the third node U5.

In one embodiment, a transmitter of the second target radio signal includes the third node U5.

In one embodiment, a target receiver of the second radio signal includes the third node U5.

In one embodiment, a transmitter of the second target radio signal is the third node U5, and a transmitter of the second information element is the third node U5.

In one embodiment, a target receiver of the second radio signal is the third node U5, and a transmitter of the second information element is the third node U5.

In one embodiment, steps in box F0 and steps in box F1 of the FIG. 6 coexist.

In one embodiment, steps in box F0 of FIG. 6 exist, while steps in box F1 of FIG. 6 do not exist.

In one embodiment, steps in box F0 of FIG. 6 do not exist, while steps in box F1 of FIG. 6 exist.

In one embodiment, the first information element is used for indicating a first reference power value, the second information element is used for indicating a second limit power value; the first power value is related to a smaller value between the first reference power value and the second limit power value; the second limit power value is related to the first power compensation and the second power compensation; the first information element indicates a first coefficient, the second limit power value is linearly correlated to the first coefficient; the second information element indicates a second power offset, the second limit power value is linearly correlated to the second power offset; the first power value is a smaller value between a maximum transmitting power value and a first candidate power value, the first candidate power value is linearly correlated to the smaller value between the first reference power value and the second limit power value, with the correlation coefficient being 1.

In one embodiment, the second power value is a transmitting power of the second radio signal; the first information element is used for indicating a first limit power value, and the second information element is used for indicating a second reference power value; the second power value is related to a smaller value between the second reference power value and the first limit power value.

In one embodiment, the second radio signal is transmitted on a PSCCH.

In one embodiment, the second radio signal is transmitted on a PSSCH.

In one embodiment, the second radio signal is transmitted on a PSCCH and a PSSCH.

In one embodiment, the second radio signal is UE-specific.

In one embodiment, the second radio signal is transmitted via groupcast.

In one embodiment, the second radio signal is transmitted via unicast.

In one embodiment, the second radio signal comprises all or part of a higher layer signaling.

In one embodiment, the second radio signal comprises all or part of an RRC layer signaling.

In one embodiment, the second radio signal comprises one or more fields of a PHY layer.

In one embodiment, the second radio signal comprises one or more fields of a piece of SCI.

In one embodiment, the second radio signal does not comprise SCI.

In one embodiment, the second radio signal comprises RS.

In one embodiment, the second radio signal comprises DMRS.

In one embodiment, the second radio signal comprises a fourth bit block; the fourth bit block comprising a positive integer number of sequentially arranged bits.

In one embodiment, all or part of bits of the fourth bit block are sequentially subjected to TB-level CRC Attachment, Code Block Segmentation, CB-level CRC Attachment, Channel Coding, Rate Matching, Code Block Concatenation, scrambling, Modulation, Layer Mapping, Antenna Port Mapping, Mapping to Physical Resource Blocks, Baseband Signal Generation, and Modulation and Upconversion to generate the first radio signal.

In one embodiment, only the fourth bit block is used for generating the second radio signal.

In one embodiment, bit block(s) other than the fourth bit block is(are) also used for generating the second radio signal.

In one embodiment, the second power value is a transmitting power of the second radio signal.

In one embodiment, the second power value is a transmitting power of the first node when transmitting the second radio signal within a second timing for transmission.

In one subembodiment, the second power value is for a first carrier in a first serving cell, the second radio signal is transmitted on the first carrier in the first serving cell.

In one embodiment, the second timing for transmission comprises a positive integer number of time domain resource element(s).

In one embodiment, the second power value is measured by dBm.

In one embodiment, the second power value is measured by mW.

In one embodiment, a smaller value between the second reference power value and the first limit power value is used for determining the second power value.

In one embodiment, when the second reference power value is less than the first limit power value, the second power value is related to the second reference power value.

In one embodiment, when the second reference power value is greater than the first limit power value, the second power value is related to the first limit power value.

In one embodiment, when the second reference power value is equal to the first limit power value, the second power value is related to the second reference power value.

In one embodiment, when the second reference power value is equal to the first limit power value, the second power value is related to the first limit power value.

In one embodiment, the second power value is related to a second smaller value, the second smaller value is a smaller value between the second reference power value and the first limit power value.

In one embodiment, the second smaller value is used for determining the second power value.

In one embodiment, the second power value is linearly correlated to the second smaller value.

In one embodiment, the second power value is in direct proportion to the second smaller value.

In one embodiment, a linear combination of the first smaller value and the second power compensation is used for determining the second power value.

In one embodiment, the second power value is linearly correlated to a linear combination of the second smaller value and the second power compensation, with the correlation coefficient being 1.

In one embodiment, the second power value is equal to a linear combination of the second smaller value and the second power compensation.

In one embodiment, the second smaller value, the second power compensation, a second bandwidth, a second transmission format adjustment value and a second power adjustment value are all used for determining the second power value.

In one embodiment, a linear combination of the second smaller value, the second power compensation, the second bandwidth, the second transmission format adjustment value and the second power adjustment value is used for determining the second power value.

In one embodiment, the second power value is equal to a sum of the second smaller value, the second power compensation, the second bandwidth, the second transmission format adjustment value and the second power adjustment value.

In one embodiment, the second bandwidth is related to a number of RBs occupied by the second radio signal and the SCS of the second radio signal.

In one embodiment, the second bandwidth is a logarithm.

In one embodiment, the second transmission format adjustment value is related to an MCS employed by the second radio signal.

In one embodiment, the second transmission format adjustment value is configured by a higher layer signaling.

In one embodiment, the second power adjustment value is configured through TPC command.

In one embodiment, the second power adjustment value is configured through DCI.

In one embodiment, the second power adjustment value is configured through SCI.

In one embodiment, the second information element indicates a second coefficient; the first limit power value is linearly correlated to the second coefficient.

In one embodiment, the first information element indicates a first power offset; the first limit power value is linearly correlated to the first power offset.

In one embodiment, the linear correlation coefficient between the first limit power value and the first power offset is −1.

In one embodiment, the linear correlation coefficient between the first limit power value and the first power offset is 1.

In one embodiment, the first limit power value is linearly correlated to a second power compensation, wherein the second coefficient is used for determining the second power compensation.

In one embodiment, the second limit power value is unrelated to the first power offset.

In one embodiment, the first limit power value is unrelated to the second power offset.

Embodiment 7

Figure 7:
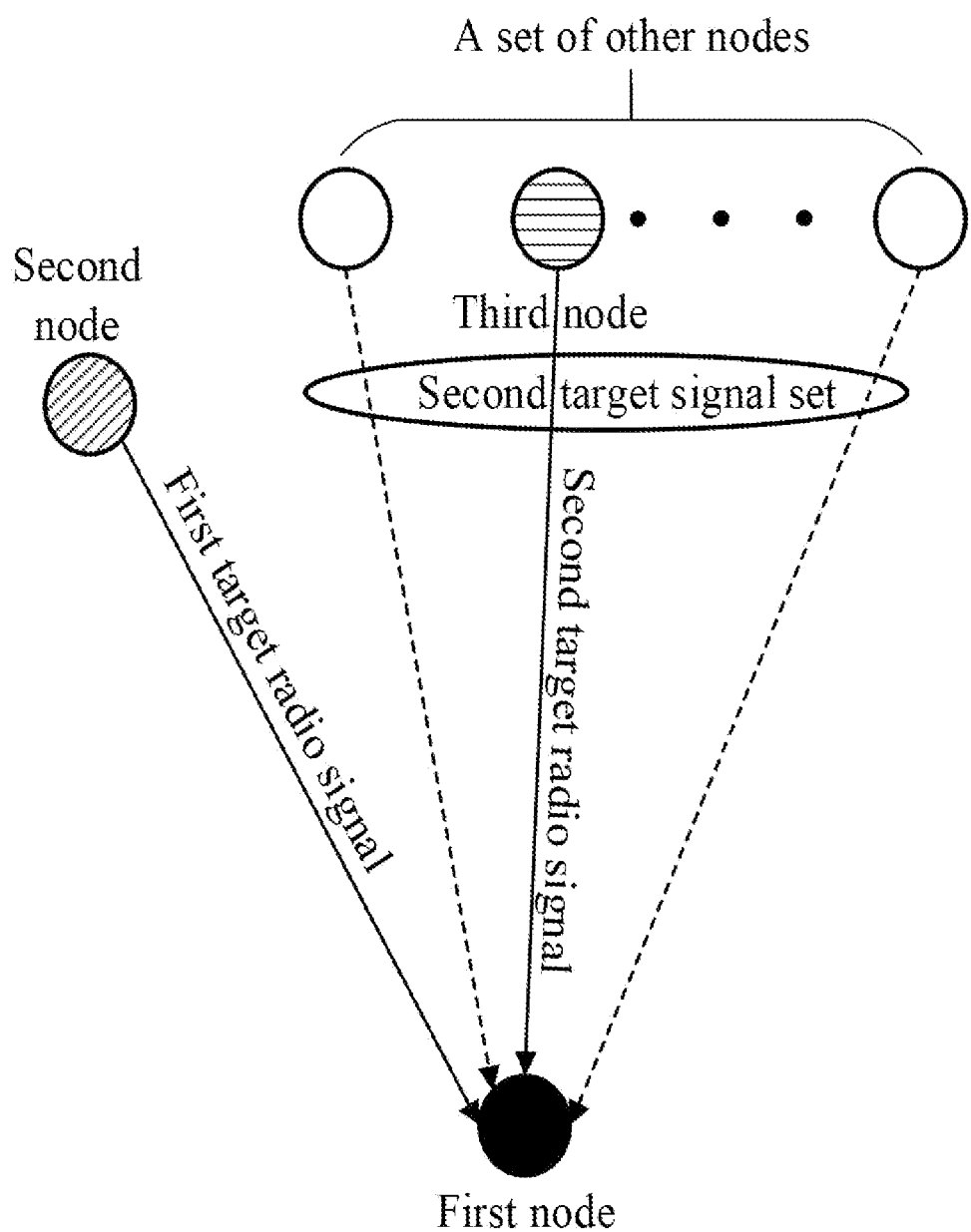
FIG. 7 illustrates a schematic diagram of relations between a first target radio signal, a second target radio signal and a second target signal set according to one embodiment of the present disclosure.

Embodiment 7 illustrates a schematic diagram of relations between a first target radio signal, a second target radio signal and a second target signal set according to one embodiment of the present disclosure, as shown in FIG. 7. In FIG. 7, each circle represents a communication node. The black circle represents the first node, the slash-filled circle represents the second node, and the circle filled with striated lines represents the third node; all arrows within an ellipsis represent the second target signal set, in which the solid arrow inside the ellipsis represents the second target radio signal and the broken arrow outside the ellipsis represents the first target radio signal.

In Embodiment 7, the first target radio signal is used for determining the first power compensation, and the second target radio signal is used for determining the second power compensation; the second limit power value is related to the first power compensation and the second power compensation.

In one embodiment, the first target radio signal is transmitted on a Physical Sidelink Broadcast Channel (PSBCH).

In one embodiment, the first target radio signal is transmitted on a PSCCH.

In one embodiment, the first target radio signal is transmitted on a PSSCH.

In one embodiment, the first target radio signal is transmitted on a Physical Sidelink Discovery Channel (PSDCH).

In one embodiment, the first target radio signal is transmitted on a PUSCH.

In one embodiment, the first target radio signal is transmitted on a PUCCH.

In one embodiment, the first target radio signal is transmitted on a PSCCH and a PSSCH.

In one embodiment, the first target radio signal is transmitted on a PUCCH and a PUSCH.

In one embodiment, the first target radio signal is cell-specific.

In one embodiment, the first target radio signal is UE-specific.

In one embodiment, the first target radio signal is transmitted via broadcast.

In one embodiment, the first target radio signal is transmitted via groupcast.

In one embodiment, the first target radio signal is transmitted via unicast.

In one embodiment, the first target radio signal comprises RS.

In one embodiment, the first target radio signal is RS.

In one embodiment, the first target radio signal includes Channel State Information Reference Signal (CSI-RS).

In one embodiment, the first target radio signal is CSI-RS.

In one embodiment, the first target radio signal includes DMRS.

In one embodiment, the first target radio signal is DMRS.

In one embodiment, the first target radio signal comprises a first sequence.

In one embodiment, the first sequence is a pseudo random sequence.

In one embodiment, the first sequence is a Zadeoff-Chu sequence.

In one embodiment, the first sequence is a Gold sequence.

In one embodiment, the first sequence is an M-sequence.

In one embodiment, the first sequence is sequentially subjected to Sequence Generation, Discrete Fourier Transform (DFT), Modulation, Resource Element Mapping and Wideband Symbol Generation to generate the first target radio signal.

In one embodiment, the first target radio signal comprises all or part of a higher layer signaling.

In one embodiment, the first target radio signal comprises all or part of an RRC layer signaling.

In one embodiment, the first target radio signal comprises one or more fields of an RRC IE.

In one embodiment, the first target radio signal comprises all or part of a MAC layer signaling.

In one embodiment, the first target radio signal comprises one or more fields of a MAC CE.

In one embodiment, the first target radio signal comprises one or more fields of a PHY layer.

In one embodiment, the first target radio signal comprises one or more fields of a piece of SCI.

In one embodiment, the first target radio signal does not comprise SCI.

In one embodiment, the first target radio signal does not comprise DMRS.

In one embodiment, the first target radio signal comprises a second bit block, the second bit block comprising a positive integer number of sequentially arranged bits.

In one embodiment, all or part of bits of the second bit block are sequentially subjected to TB-level CRC Attachment, Code Block Segmentation, CB-level CRC Attachment, Channel Coding, Rate Matching, Code Block Concatenation, scrambling, Modulation, Layer Mapping, Antenna Port Mapping, Mapping to Physical Resource Blocks, Baseband Signal Generation, and Modulation and Upconversion to generate the first target radio signal.

In one embodiment, the second target radio signal belongs to the second target signal set.

In one embodiment, the second target signal set comprises a positive integer number of second-type target radio signal(s), the second target radio signal is one of the positive integer number of second-type target radio signal(s).

In one embodiment, the second target signal set only comprises the second target radio signal.

In one embodiment, any second-type target radio signal of the second target signal set is transmitted on a PSBCH.

In one embodiment, any second-type target radio signal of the second target signal set is transmitted on a PSCCH.

In one embodiment, any second-type target radio signal of the second target signal set is transmitted on a PSSCH.

In one embodiment, any second-type target radio signal of the second target signal set is transmitted on a PSDCH.

In one embodiment, any second-type target radio signal of the second target signal set is UE-specific.

In one embodiment, any second-type target radio signal of the second target signal set is transmitted via unicast.

In one embodiment, any second-type target radio signal of the second target signal set is RS.

In one embodiment, any second-type target radio signal of the second target signal set comprises CSI-RS.

In one embodiment, any second-type target radio signal of the second target signal set is CSI-RS.

In one embodiment, any second-type target radio signal of the second target signal set comprises DMRS.

In one embodiment, any second-type target radio signal of the second target signal set is DMRS.

In one embodiment, any second-type target radio signal of the second target signal set comprises all or part of a higher layer signaling.

In one embodiment, any second-type target radio signal of the second target signal set comprises all or part of a MAC layer signaling.

In one embodiment, any second-type target radio signal of the second target signal set comprises one or more fields of a PHY layer.

In one embodiment, the second target radio signal is transmitted on a PSBCH.

In one embodiment, the second target radio signal is transmitted on a PSCCH.

In one embodiment, the second target radio signal is transmitted on a PSSCH.

In one embodiment, the second target radio signal is transmitted on a PSDCH.

In one embodiment, the second target radio signal comprises RS.

In one embodiment, the second target radio signal comprises CSI-RS.

In one embodiment, the second target radio signal comprises DMRS.

In one embodiment, the second target radio signal comprises a second sequence.

In one embodiment, the second sequence is a pseudo random sequence.

In one embodiment, the second sequence is a Zadeoff-Chu sequence.

In one embodiment, the second sequence is a Gold sequence.

In one embodiment, the second sequence is an M sequence.

In one embodiment, the second sequence is sequentially subjected to Sequence Generation, Discrete Fourier Transform (DFT), Modulation, Resource Element Mapping and Wideband Symbol Generation to generate the second target radio signal.

In one embodiment, the second target radio signal comprises all or part of a higher layer signaling.

In one embodiment, the second target radio signal comprises all or part of an RRC layer signaling.

In one embodiment, the second target radio signal comprises one or more fields of an RRC IE.

In one embodiment, the second target radio signal comprises one or more fields of a PHY layer.

In one embodiment, the second target radio signal comprises one or more fields of a piece of SCI.

In one embodiment, the second target radio signal does not comprise SCI.

In one embodiment, the second target radio signal does not comprise DMRS.

In one embodiment, the second target radio signal comprises a third bit block, the third bit block comprising a positive integer number of sequentially arranged bits.

In one embodiment, the third bit block is a CB of CBs acquired after a TB is sequentially subjected to TB-level CRC Attachment, Code Block segmentation and CB-level CRC Attachment.

In one embodiment, all or part of bits of the third bit block are sequentially subjected to TB-level CRC Attachment, Code Block Segmentation, CB-level CRC Attachment, Channel Coding, Rate Matching, Code Block Concatenation, scrambling, Modulation, Layer Mapping, Antenna Port Mapping, Mapping to Physical Resource Blocks, Baseband Signal Generation, and Modulation and Upconversion to generate the second target radio signal.

In one embodiment, the first power compensation is measured by dB.

In one embodiment, the first power compensation is measured by multiple.

In one embodiment, the first power compensation is measured by mW.

In one embodiment, the first power compensation is linearly correlated to a first pathloss.

In one embodiment, the first power compensation is in direct proportion to the first pathloss.

In one embodiment, the first power compensation is the first pathloss.

In one embodiment, the first pathloss is a pathloss from a receiver of the first target radio signal to a transmitter of the first target radio signal.

In one embodiment, the first pathloss is a pathloss from the first node to a transmitter of the first target radio signal.

In one embodiment, the first pathloss is a pathloss from a receiver of the first target radio signal to the second node.

In one embodiment, the first pathloss is a pathloss from the first node to the second node.

In one embodiment, the first pathloss is a pathloss from a transmitter of the first target radio signal to a receiver of the first target radio signal.

In one embodiment, the first pathloss is a pathloss from a transmitter of the first target radio signal to the first node.

In one embodiment, the first pathloss is a pathloss from the second node to a receiver of the first target radio signal.

In one embodiment, the first pathloss is a pathloss from the second node to the first node.

In one embodiment, the first pathloss is measured by dB.

In one embodiment, the first pathloss is measured by multiple.

In one embodiment, the first pathloss is measured by mW.

In one embodiment, the first pathloss is a difference between a transmitting power value of the first target radio signal and a receiving power of the first target radio signal at the first node.

In one embodiment, the transmitting power of the first target radio signal is configurable.

In one embodiment, the transmitting power of the first target radio signal is fixed.

In one embodiment, the transmitting power of the first target radio signal is pre-configured.

In one embodiment, the first target radio signal indicates the transmitting power of the first target radio signal.

In one embodiment, the serving cell of the first node indicates the transmitting power of the first target radio signal.

In one embodiment, the serving cell of the second node indicates the transmitting power of the first target radio signal.

In one embodiment, the transmitting power of the first target radio signal is fixed.

In one embodiment, the first target radio signal comprises the first pathloss.

In one embodiment, the first target radio signal explicitly indicates the first pathloss.

In one embodiment, the first target radio signal comprises the first power compensation.

In one embodiment, the first target radio signal explicitly indicates the first power compensation.

In one embodiment, the second power compensation is measured by dB.

In one embodiment, the second power compensation is measured by multiple.

In one embodiment, the second power compensation is measured by mW.

In one embodiment, the second power compensation is linearly correlated to a second pathloss.

In one embodiment, the second power compensation is in direct proportion to the second pathloss.

In one embodiment, the second power compensation is a product of the second pathloss and the second coefficient.

In one embodiment, the second power compensation is the second pathloss.

In one embodiment, the second pathloss is a pathloss from a receiver of the second target radio signal to a transmitter of the second target radio signal.

In one embodiment, the second pathloss is a pathloss from the first node to a transmitter of the second target radio signal.

In one embodiment, the second pathloss is a pathloss from a receiver of the second target radio signal to the third node.

In one embodiment, the second pathloss is a pathloss from the first node to the third node.

In one embodiment, the second pathloss is a pathloss from a transmitter of the second target radio signal to a receiver of the first target radio signal.

In one embodiment, the second pathloss is a pathloss from a transmitter of the second target radio signal to the first node.

In one embodiment, the second pathloss is a pathloss from the third node to a receiver of the first target radio signal.

In one embodiment, the second pathloss is a pathloss from the third node to the first node.

In one embodiment, the second pathloss is measured by dB.

In one embodiment, the second pathloss is measured by multiple.

In one embodiment, the second pathloss is measured by mW.

In one embodiment, the second pathloss is a difference between a transmitting power of the second target radio signal and a receiving power of the second target radio signal at the first node.

In one embodiment, the transmitting power of the second target radio signal is configurable.

In one embodiment, the transmitting power of the second target radio signal is fixed.

In one embodiment, the transmitting power of the second target radio signal is pre-configured.

In one embodiment, the second target radio signal indicates the transmitting power of the second target radio signal.

In one embodiment, the serving cell of the first node indicates the transmitting power of the second target radio signal.

In one embodiment, the serving cell of the second node indicates the transmitting power of the second target radio signal.

In one embodiment, the serving cell of the third node indicates the transmitting power of the second target radio signal.

In one embodiment, the transmitting power of the second target radio signal is fixed.

In one embodiment, the second target radio signal comprises the second pathloss.

In one embodiment, the second target radio signal explicitly indicates the second pathloss.

In one embodiment, the second target radio signal comprises the second pathloss.

In one embodiment, the second target radio signal explicitly indicates the second power compensation.

In one embodiment, the second target radio signal comprises the second power compensation.

In one embodiment, the first power compensation and the second power compensation are both measured by dB.

In one embodiment, the first power compensation and the second power compensation are both measured by multiple.

In one embodiment, a transmitter of the first target radio signal and a transmitter of the first information element are co-located, and a transmitter of the second target radio signal and a transmitter of the second information element are co-located.

In one embodiment, a transmitter of the first target radio signal and a transmitter of the first information element are the second node; a transmitter of the second target radio signal and a transmitter of the second information element are the third node.

In one embodiment, a transmitter of the first target radio signal and a transmitter of the first information element are one UE; a transmitter of the second target radio signal and a transmitter of the second information element are another UE.

In one embodiment, a backhaul link between a transmitter of the first target radio signal and a transmitter of the first information element is ideal (i.e., the latency is ignorable); backhaul link between a transmitter of the second target radio signal and a transmitter of the second information element is ideal (i.e., the latency is ignorable).

In one embodiment, a transmitter of the first target radio signal and a transmitter of the first information element share a same baseband unit; a transmitter of the second target radio signal and a transmitter of the second information element share a same baseband unit.

In one embodiment, the first target radio signal and the second target radio signal are broadcast.

In one embodiment, the first target radio signal and the second target radio signal are groupcast.

In one embodiment, a channel occupied by the first target radio signal includes a PSDCH.

In one embodiment, a channel occupied by the first target radio signal includes a PSBCH.

In one embodiment, the first power compensation refers to the pathloss between a transmitter of the first target radio signal and the first node, while the second power compensation refers to the pathloss between a transmitter of the second target radio signal and the first node.

In one embodiment, the first power compensation refers to a difference between a transmitting power of the first target radio signal and a receiving power of the first target radio signal at the first node, while the second power compensation refers to a difference between a transmitting power of the second target radio signal and a receiving power of the second target radio signal at the first node.

In one embodiment, the first target radio signal indicates the transmitting power of the first target radio signal, and the second target radio signal indicates the transmitting power of the second target radio signal.

In one embodiment, a serving cell of the first node indicates the transmitting power of the first target radio signal and the transmitting power of the second target radio signal.

In one embodiment, the transmitting power of the first target radio signal and the transmitting power of the second target radio signal are fixed.

In one embodiment, the first target radio signal explicitly indicates the first power compensation, while the second target radio signal explicitly indicates the second power compensation.

Embodiment 8

Figure 8:
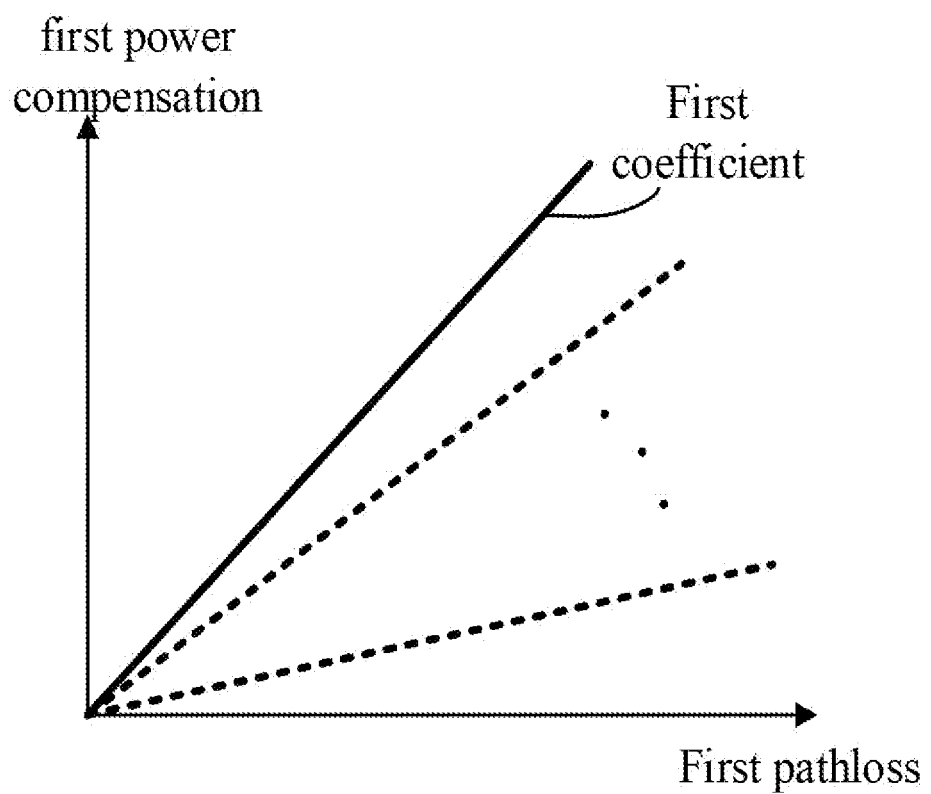
FIG. 8 illustrates a schematic diagram of relations between a first coefficient, a first pathloss and a first power compensation according to one embodiment of the present disclosure.

Embodiment 8 illustrates a schematic diagram of relations between a first coefficient, a first pathloss and a first power compensation according to one embodiment of the present disclosure, as shown in FIG. 8. In FIG. 8, the horizontal axis represents the first pathloss in the present disclosure, and the vertical axis represents the first power compensation in the present disclosure. The thick oblique line and each of the oblique broken lines respectively represent functional relations between the first power compensation and the first pathloss. The slope of each oblique line represents the first coefficient in the present disclosure.

In Embodiment 8, the first information element indicates a first coefficient; the second limit power value is linearly correlated to the first coefficient.

In one embodiment, the first information element is used for indicating the first coefficient.

In one embodiment, the first information element comprises the first coefficient.

In one embodiment, the first coefficient is used for generating a scrambling sequence for scrambling the first information element.

In one embodiment, the first reference power value and the first coefficient are indicated by the first information element independently.

In one embodiment, the first information element comprises a first sub-information element and a second sub-information element, of which the first sub-information element is used for indicating the first reference power value and the second sub-information element is used for indicating the first coefficient.

In one embodiment, the first information element comprises a first sub-information element and a second sub-information element, of which the first sub-information element comprises the first reference power value and the second sub-information element comprises the first coefficient.

In one embodiment, the first sub-information element and the second sub-information element are RRC layer signalings respectively.

In one embodiment, the first sub-information element and the second sub-information element are RRC IEs respectively in an RRC layer signaling.

In one embodiment, the first information element is an RRC layer signaling, the first reference power is an RRC IE in the first information element, the first coefficient is used for generating a scrambling sequence for scrambling the first information element.

In one embodiment, a first power configuration set comprises a positive integer number of first-type power configuration(s), any of the positive integer number of first-type power configuration(s) comprises the first reference power value and the first coefficient.

In one subembodiment, a first candidate power configuration and a second power configuration are respectively any two of the positive integer number of first-type power configurations, the first reference power value in the first candidate power configuration is different from the first reference power value in the second candidate power configuration.

In one subembodiment, a first candidate power configuration and a second power configuration are respectively any two of the positive integer number of first-type power configurations, the value of the first coefficient in the first candidate power configuration is different from the value of the first coefficient in the second candidate power configuration.

In one subembodiment, a first candidate power configuration and a second power configuration are respectively any two of the positive integer number of first-type power configurations. The first reference power value in the first candidate power configuration is different from the first reference power value in the second candidate power configuration; the value of the first coefficient in the first candidate power configuration is different from the value of the first coefficient in the second candidate power configuration.

In one embodiment, the first information element comprises a first index, the first index is used for indicating a first power configuration out of the first power configuration set, the first power configuration is one of the positive integer number of first-type power configuration(s) comprised in the first power configuration set.

In one embodiment, the first power compensation is in direct proportion to the first pathloss, the first coefficient being a scaling factor of the first power compensation and the first pathloss.

In one embodiment, the first power compensation is linearly correlated to a product of the first pathloss and a first coefficient.

In one embodiment, the first power compensation is in direct proportion to a product of the first pathloss and a first coefficient.

In one embodiment, the first power compensation is equal to a product of the first pathloss and a first coefficient.

In one embodiment, the first power compensation is determined through formula $\alpha_1 \cdot PL_1$, where the $PL_1$ is the first pathloss, and the $\alpha_1$ is the first coefficient.

In one embodiment, the first coefficient is a decimal ranging from 0 to 1.

In one embodiment, the first coefficient is greater than 0 and less than 1.

In one embodiment, the first coefficient is equal to 1.

In one embodiment, the first coefficient is configurable.

In one embodiment, the first coefficient is fixed.

In one embodiment, the first coefficient is pre-configured.

In one embodiment, the first coefficient is transferred from a higher layer of the first node to a physical layer of the first node.

In one embodiment, the second limit power value is linearly correlated to the first power compensation, with the first power compensation being a product of the first coefficient and the first pathloss.

In one embodiment, the linear correlation coefficient between the second limit power value and the first power compensation is −1.

In one embodiment, the linear correlation coefficient between the second limit power value and the first power compensation is 1.

In one embodiment, the second limit power value is equal to the first power compensation.

In one embodiment, the second limit power value is determined by the formula $P_{limit}(2) \sim -\alpha_1 \cdot PL_1$, where the $P_{limit}(2)$ is the second limit power value, the $PL_1$ is the first pathloss, the $\alpha_1$ is the first coefficient and the symbol "~" shows a direct proportionality.

In one embodiment, the second limit power value is linearly correlated to the second reference power value, and the second limit power value is linearly correlated to the first power compensation.

In one embodiment, the second limit power value is linearly correlated to a sum of the second reference power value and the first power compensation.

In one embodiment, the second limit power value is linearly correlated to a difference between the second reference power value and the first power compensation.

In one embodiment, the second limit power value is determined by the formula $P_{limit}(2) \sim P_O(2) - \alpha_1 \cdot PL_1$, where the $P_{limit}(2)$ is the second limit power value, the $P_O(2)$ is the second reference power value, the $PL_1$ is the first pathloss, the $\alpha_1$ is the first coefficient, and the symbol "~" shows a direct proportionality.

In one embodiment, the second power compensation is linearly correlated to a product of the second pathloss and a second coefficient.

In one embodiment, the second power compensation is in direct proportion to a product of the second pathloss and a second coefficient.

In one embodiment, the second power compensation is equal to a product of the second pathloss and a second coefficient.

In one embodiment, the second power compensation is the second pathloss.

In one embodiment, the second power compensation is determined by the formula $PL_2$, where the $PL_2$ is the second pathloss.

In one embodiment, the second coefficient is a decimal ranging from 0 to 1.

In one embodiment, the second coefficient is greater than 0 and less than 1.

In one embodiment, the second coefficient is equal to 1.
In one embodiment, the second coefficient is configurable.
In one embodiment, the second coefficient is fixed.
In one embodiment, the second coefficient is pre-configured.

In one embodiment, the second coefficient is transferred from a higher layer of the first node to a physical layer of the first node.

In one embodiment, the second limit power value is linearly correlated to the second power compensation, the second power compensation being a product of the first coefficient and the second pathloss.

In one embodiment, the second limit power value is linearly correlated to the second power compensation, the second power compensation being the second pathloss.

In one embodiment, the second limit power value is linearly correlated to the second power compensation, and the second limit power value is linearly correlated to the first power compensation.

In one embodiment, the second limit power value is linearly correlated to a difference between the second power compensation and the first power compensation.

In one embodiment, the second limit power value is determined through the formula $P_{limit}(2) \sim PL_2 - \alpha_1 \cdot PL_1$, where the $P_{limit}(2)$ is the second limit power value, the $PL_2$ is the second pathloss, the $PL_1$ is the first pathloss, the $\alpha_1$ is the first coefficient, and the symbol "~" shows a direct proportionality.

In one embodiment, the second limit power value is linearly correlated to the second reference power value, the second limit power value is linearly correlated to the second power compensation, and the second limit power value is linearly correlated to the first power compensation.

In one embodiment, the second limit power value is linearly correlated to the second reference power value and also to the difference between the second power compensation and the first power compensation.

In one embodiment, the second limit power value is determined through the formula $P_{limit}(2) \sim P_O(2) + PL_2 - \alpha_1 \cdot PL_1$, where the $P_{limit}(2)$ is the second limit power value, the $P_O(2)$ is the second reference power value, the $PL_2$ is the second pathloss, the $PL_1$ is the first pathos, the $\alpha_1$ is the first coefficient, and the symbol "~" shows a direct proportionality.

In one embodiment, the second information element is used for indicating a second power offset.

In one embodiment, the second information element comprises the second power offset.

In one embodiment, the second power offset is used for generating a scrambling sequence for scrambling the second information element.

In one embodiment, the second reference power value and the second power offset are indicated by the second information element independently.

In one embodiment, the second information element comprises a third sub-information element and a fourth sub-information element, wherein the third sub-information element is used for indicating the second reference power value, and the fourth sub-information element is used for indicating the second power offset.

In one embodiment, the second information element comprises a third sub-information element and a fourth sub-information element, wherein the third sub-information element comprises the second reference power value, and the fourth sub-information element comprises the second power offset.

In one embodiment, the third sub-information element and the fourth sub-information element are RRC layer signalings respectively.

In one embodiment, the third sub-information element and the fourth sub-information element are RRC IEs respectively in an RRC layer signaling.

In one embodiment, the third sub-information element is an RRC layer signaling, and the fourth sub-information element is a PHY signaling.

In one embodiment, the third sub-information element is an RRC layer signaling, and the fourth sub-information element is a piece of SCI.

In one embodiment, the third sub-information element is an RRC layer signaling, and the fourth sub-information element is a piece of DCI.

In one embodiment, the second information element is an RRC layer signaling, the second reference power value is an RRC IE in the second information element, the second power offset is used for generating a scrambling sequence for scrambling the second information element.

In one embodiment, a second power configuration set comprises a positive integer number of second-type power configuration(s), any of the positive integer number of the second-type power configuration(s) comprises the second reference power value and the second power offset.

In one subembodiment, a third candidate power configuration and a fourth candidate power configuration are respectively any two of the positive integer number of second-type power configurations, the second reference power value in the third candidate power configuration is different from the second reference power value in the fourth candidate power configuration.

In one subembodiment, a third candidate power configuration and a fourth candidate power configuration are respectively any two of the positive integer number of second-type power configurations, the value of the second power offset in the third candidate power configuration is different from the value of the second power offset in the fourth candidate power configuration.

In one subembodiment, a third candidate power configuration and a fourth candidate power configuration are respectively any two of the positive integer number of second-type power configurations. The second reference power value in the third candidate power configuration is different from the second reference power value in the fourth candidate power configuration; the value of the second power offset in the third candidate power configuration is different from the value of the second power offset in the fourth candidate power configuration.

In one embodiment, the second information element comprises a second index, the second index being used for indicating a second power configuration out of the second power configuration set, the second power configuration is one of the positive integer number of second-type power configuration(s) comprised in the second power configuration set.

In one embodiment, the second power offset is measured by dB.

In one embodiment, the second power offset is measured by multiple.

In one embodiment, the second power offset is measured by mW.

In one embodiment, the second power offset is one of 3 dB, 1 dB, 0 dB, −1 dB and 3 dB.

In one embodiment, the second power offset is configurable.

In one embodiment, the second power offset is fixed.

In one embodiment, the second power offset is pre-configured.

In one embodiment, the second power offset is transferred from a higher layer of the first node to a physical layer of the first node.

In one embodiment, the second limit power value is linearly correlated to the second power offset.

In one embodiment, the second limit power value is in direct proportion to the second power offset.

In one embodiment, the linear correlation coefficient between the second limit power value and the second power offset is 1.

In one embodiment, the linear correlation coefficient between the second limit power value and the second power offset is greater than 0 and less than 1.

In one embodiment, the second limit power value is determined by the formula $P_{limit}(2)\sim\text{offset}(2)$, where the $P_{limit}(2)$ is the second limit power value and the offset(2) is the second power offset.

In one embodiment, the second limit power value is linearly correlated to the second reference power value, and the second limit power value is linearly correlated to the second power offset.

In one embodiment, the second limit power value is linearly correlated to a sum of the second reference power value and the second power offset.

In one embodiment, the second limit power value is determined by the formula $P_{limit}(2)\sim P_O(2)+\text{offset}(2)$, where the $P_{limit}(2)$ is the second limit power value, the $P_O(2)$ is the second reference power value, and the offset(2) is the second power offset.

In one embodiment, the second limit power value is linearly correlated to the second reference power value, the second limit power value is linearly correlated to the second power offset, the second limit power value is linearly correlated to the second power compensation, and the second limit power value is linearly correlated to the first power compensation.

In one embodiment, the second limit power value is linearly correlated to a sum of the second reference power value, the second power offset and the second power compensation.

In one embodiment, the second limit power value is equal to a sum of the second reference power value, the second power offset and the second power compensation.

In one embodiment, the second limit power value is linearly correlated to a sum of the second reference power value, the second power offset, the second power compensation and an opposite number of the first power compensation.

In one embodiment, the second limit power value is equal to a sum of the second reference power value, the second power offset, the second power compensation and an opposite number of the first power compensation.

In one embodiment, the second limit power value is determined by the formula $P_{limit}(2)=P_O(2)+\text{offset}(2)+PL_2$, where the $P_{limit}(2)$ is the second limit power value, the $P_O(2)$ is the second reference power value, the offset(2) is the second power offset, and the $PL_2$ is the second pathloss.

In one embodiment, the second limit power value is determined by the formula $P_{limit}(2)\sim P_O(2)+\text{offset}(2)+PL_2-\alpha_1 \cdot PL_1$, where the $P_{limit}(2)$ is the second limit power value, the $P_O(2)$ is the second reference power value, the offset(2) is the second power offset, the $PL_2$ is the second pathloss, the $PL_1$ is the first pathloss, and the $\alpha_1$ is the first coefficient, and the symbol "~" shows a direct proportionality.

In one embodiment, the second limit power value is determined by the formula $P_{limit}(2)=P_O(2)+\text{offset}(2)+PL_2-\alpha_1 \cdot PL_1$, where the $P_{limit}(2)$ is the second limit power value, the $P_O(2)$ is the second reference power value, the offset(2) is the second power offset, the $PL_2$ is the second pathloss, the $PL_1$ is the first pathloss, and the $\alpha_1$ is the first coefficient.

Embodiment 9

Figure 9:
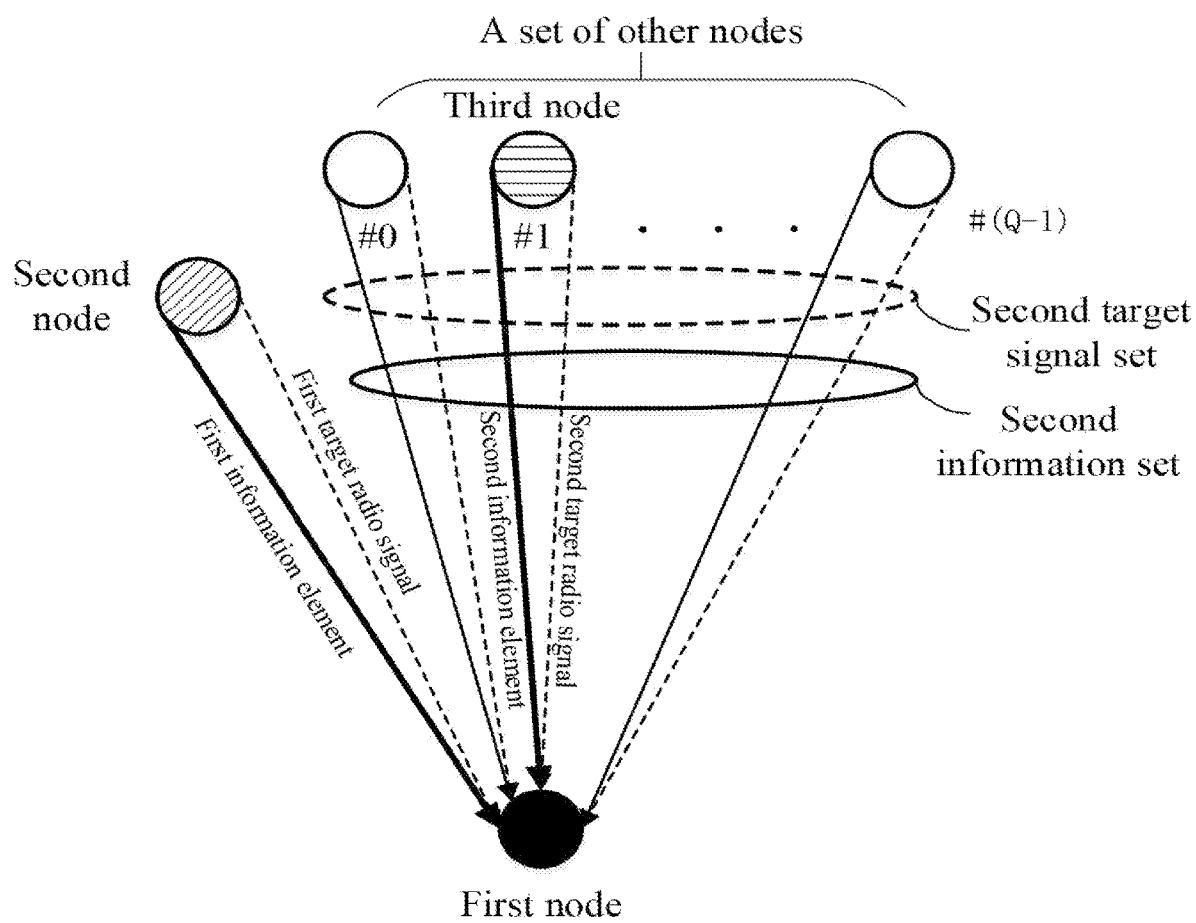
FIG. 9 illustrates a schematic diagram of relation between a second information element and a second information set according to one embodiment of the present disclosure.

Embodiment 9 illustrates a schematic diagram of relation between a second information element and a second information set according to one embodiment of the present disclosure, as shown in FIG. 9. In FIG. 9, each circle represents a communication. The black circle represents the first node, the slash-filled circle represents the second node, and the circle filled with striated lines represents the third node. All broken arrows within the broken lined ellipsis represent the second target signal set; all solid arrows inside the solid lined ellipsis represent the second information set. The thick solid arrow inside the solid lined ellipsis represents the second information element; the thick solid arrow outside the ellipsis represents the first information element; and the broken lined arrow outside the ellipsis represents the first target radio signal.

In Embodiment 9, the second target signal set comprises Q second-type target radio signals, the second target radio signal is one of the Q second-type target radio signals; the second information set comprises Q second-type information elements, the second information element is one of the Q second-type information elements; the Q second-type information elements are respectively used for indicating Q limit power values, the second limit power value is a smallest one of the Q limit power values; the Q is a positive integer greater than 1.

In one embodiment, any of the Q second-type information elements is transmitted on a PSCCH.

In one embodiment, any of the Q second-type information elements is transmitted on a PSSCH.

In one embodiment, any of the Q second-type information elements is transmitted on a PSBCH.

In one embodiment, any of the Q second-type information elements is transmitted on a PSDCH.

In one embodiment, any of the Q second-type information elements is transmitted on a PDCCH.

In one embodiment, any of the Q second-type information elements is transmitted on a PDSCH.

In one embodiment, at least one of the Q second-type information elements is transmitted on a PSCCH.

In one embodiment, at least one of the Q second-type information elements is transmitted on a PSSCH.

In one embodiment, at least one of the Q second-type information elements is transmitted on a PSBCH.

In one embodiment, at least one of the Q second-type information elements is transmitted on a PSDCH.

In one embodiment, any of the Q second-type information elements is transmitted on a PSCCH and a PSSCH.

In one embodiment, any of the Q second-type information elements is transmitted on a PDCCH and a PDSCH.

In one embodiment, any of the Q second-type information elements is transmitted via broadcast.

In one embodiment, any of the Q second-type information elements is transmitted via groupcast.

In one embodiment, any of the Q second-type information elements is transmitted via unicast.

In one embodiment, any of the Q second-type information elements is cell-specific.

In one embodiment, any of the Q second-type information elements is UE-specific.

In one embodiment, any of the Q second-type information elements comprises all or part of a higher layer signaling.

In one embodiment, any of the Q second-type information elements comprises all or part of an RRC layer signaling.

In one embodiment, any of the Q second-type information elements comprises one or more fields of an RRC IE.

In one embodiment, any of the Q second-type information elements comprises all or part of a MAC layer signaling.

In one embodiment, any of the Q second-type information elements comprises one or more fields of a MAC CE.

In one embodiment, any of the Q second-type information elements comprises one or more fields of a PHY layer signaling.

In one embodiment, any of the Q second-type information elements comprises one or more fields of a piece of SCI.

In one embodiment, any of the Q second-type information elements comprises one or more fields of a piece of DCI.

In one embodiment, any of the Q second-type information elements is an RRC layer signaling.

In one embodiment, any of the Q second-type information elements is an IE in an RRC layer signaling.

In one embodiment, any of the Q second-type information elements is a field of an RRC IE.

In one embodiment, any of the Q second-type information elements is semi-statically configured.

In one embodiment, any of the Q second-type information elements is dynamically configured.

In one embodiment, the Q second-type information units are respectively transmitted by Q transmitters.

In one embodiment, any two of the Q transmitters are non-co-located.

In one embodiment, any two of the Q transmitters are respectively two different communication nodes.

In one embodiment, any two of the Q transmitters are respectively two different UEs.

In one embodiment, the backhaul link between any two of the Q transmitters is not ideal.

In one embodiment, any two of the Q transmitters do not share a same baseband unit.

In one embodiment, a downlink signaling is used for determining the transmitter of the second information element out of the Q transmitters.

In one embodiment, the Q second-type information elements respectively carry Q indices, wherein the Q indices are used for determining the second information element out of the Q second-type information elements.

In one embodiment, an index of the second information element is a smallest index of the Q indices.

In one embodiment, any of the Q limit power values is an interference limit power of a transmitter of a corresponding second-type information element of the second information when receiving the first radio signal.

In one embodiment, any of the Q limit power values is cell-specific.

In one embodiment, any of the Q limit power values is UE-specific.

In one embodiment, any of the Q limit power values is specific to a plurality of UEs.

In one embodiment, any of the Q limit power values is specific to the first node.

In one embodiment, at least one of the Q limit power values is cell-specific.

In one embodiment, at least one of the Q limit power values is UE-specific.

In one embodiment, at least one of the Q limit power values is specific to a plurality of UEs.

In one embodiment, at least one of the Q limit power values is specific to the first node.

In one embodiment, any of the Q limit power values is measured by dBm.

In one embodiment, any of the Q limit power values is measured by mW.

In one embodiment, the second limit power value is a smallest one of the Q limit power values.

In one embodiment, among the Q limit power values there is not any limit power value less than the second limit power value.

In one embodiment, the second target signal set comprises Q second-type target radio signals, the second target radio signal is one of the Q second-type radio signals; the Q second-type target radio signals are respectively used for determining Q limit power values, the second limit power value is a limit power value corresponding to the second target radio signal out of the Q limit power values.

In one embodiment, the Q second-type information elements respectively indicate Q power offsets, the second power offset is a power offset corresponding to the second information element out of the Q power offsets, the Q limit power values are linearly correlated to the Q power offsets respectively.

In one embodiment, linear correlation coefficients respectively between the Q limit power values and the Q power offsets are equal.

In one embodiment, linear correlation coefficients respectively between the Q limit power values and the Q power offsets are equal to 1.

In one embodiment, linear correlation coefficients respectively between the Q limit power values and the Q power offsets are greater than 0 and less than 1.

In one embodiment, linear correlation coefficients respectively between the Q limit power values and the Q power offsets are configured independently.

Embodiment 10

Figure 10:
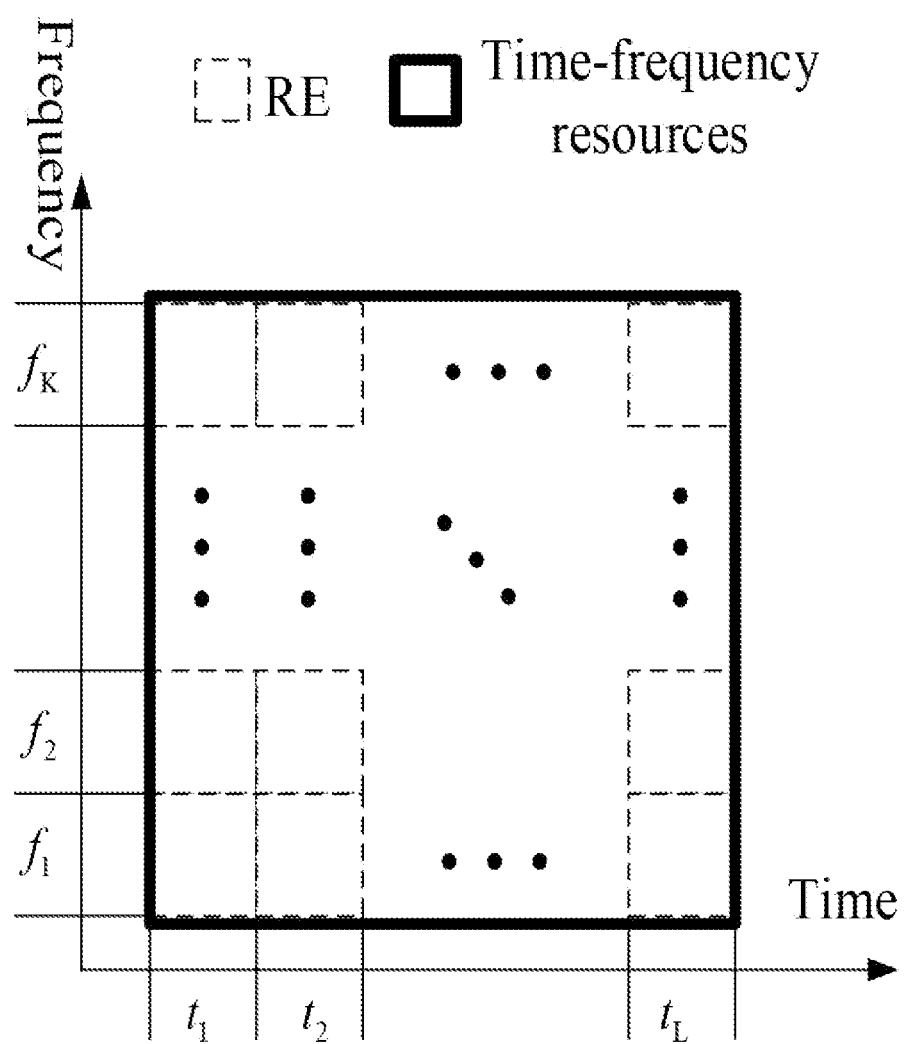
FIG. 10 illustrates a schematic diagram of a first time-frequency resource according to one embodiment of the present disclosure.

Embodiment 10 illustrates a schematic diagram of a first time-frequency resource according to one embodiment of the present disclosure, as shown in FIG. 10. In FIG. 10, each small box framed with broken lines represents a Resource Element (RE), and the large square framed with thick lines represents a time-frequency resource. In FIG. 10, a time-frequency resource occupies K subcarriers in frequency domain, and occupies L multicarrier symbols in time domain, wherein the K and the L are both positive integers. In FIG. 10, $t_1, t_2, \ldots,$ and $t_L$ represent L Symbols; $f_1, f_2, \ldots,$ and $f_K$ represent K Subcarriers.

In Embodiment 10, a time-frequency resource occupies K subcarriers in frequency domain and occupies L multicarrier symbols in time domain, the K and the L being positive integers.

In one embodiment, the K is equal to 12.
In one embodiment, the K is equal to 72.
In one embodiment, the K is equal to 127.
In one embodiment, the K is equal to 240.
In one embodiment, the K is equal to 1.
In one embodiment, the K is equal to 2.
In one embodiment, the K is no greater than 14.
In one embodiment, any of the L multicarrier symbols is at least one of Frequency Division Multiple Access (FDMA) symbol, Orthogonal Frequency Division Multiplexing (OFDM) symbol, Single-Carrier Frequency Division Multiple Access (SC-FDMA) symbol, Discrete Fourier Transform Spread Orthogonal Frequency Division Multiplexing (DFTS-OFDM) symbol, Filter Bank Multi-Carrier (FBMC) symbol, and Interleaved Frequency Division Multiple Access (IFDMA) symbol.

In one embodiment, the time domain resource element comprises a positive integer number of Radio Frame(s).

In one embodiment, the time domain resource element is a Radio Frame.

In one embodiment, the time domain resource element comprises a positive integer number of Subframe(s).

In one embodiment, the time domain resource element is a Subframe.

In one embodiment, the time domain resource element comprises a positive integer number of slot(s).

In one embodiment, the time domain resource element is a slot.

In one embodiment, the time domain resource element comprises a positive integer number of multicarrier symbol(s).

In one embodiment, the time domain resource element is a multicarrier symbol.

In one embodiment, the time domain resource element comprises a positive integer number of carrier(s).

In one embodiment, the time domain resource element is a carrier.

In one embodiment, the time domain resource element comprises a positive integer number of Bandwidth Part(s) (BWP).

In one embodiment, the time domain resource element is a BWP.

In one embodiment, the time domain resource element comprises a positive integer number of Subchannel(s).

In one embodiment, the time domain resource element is a Subchannel.

In one embodiment, the Subchannel comprises a positive integer number of Resource Block(s) (RB).

In one embodiment, the number of RB(s) comprised by the Subchannel is variable.

In one embodiment, the RB comprises a positive integer number of subcarrier(s) in frequency domain.

In one embodiment, the RB comprises 12 subcarriers in frequency domain.

In one embodiment, the Subchannel comprises a positive integer number of Physical Resource Block(s) (RB).

In one embodiment, the number of PRB(s) comprised by the Subchannel is variable.

In one embodiment, the PRB comprises a positive integer number of subcarrier(s) in frequency domain.

In one embodiment, the PRB comprises 12 subcarriers in frequency domain.

In one embodiment, the frequency domain resource element comprises a positive integer number of RB(s).

In one embodiment, the frequency domain resource element is an RB.

In one embodiment, the frequency domain resource element comprises a positive integer number of PRB(s).

In one embodiment, the frequency domain resource element is a PRB.

In one embodiment, the frequency domain resource element comprises a positive integer number of subcarrier(s).

In one embodiment, the frequency domain resource element is a subcarrier.

Embodiment 11

Figure 11:
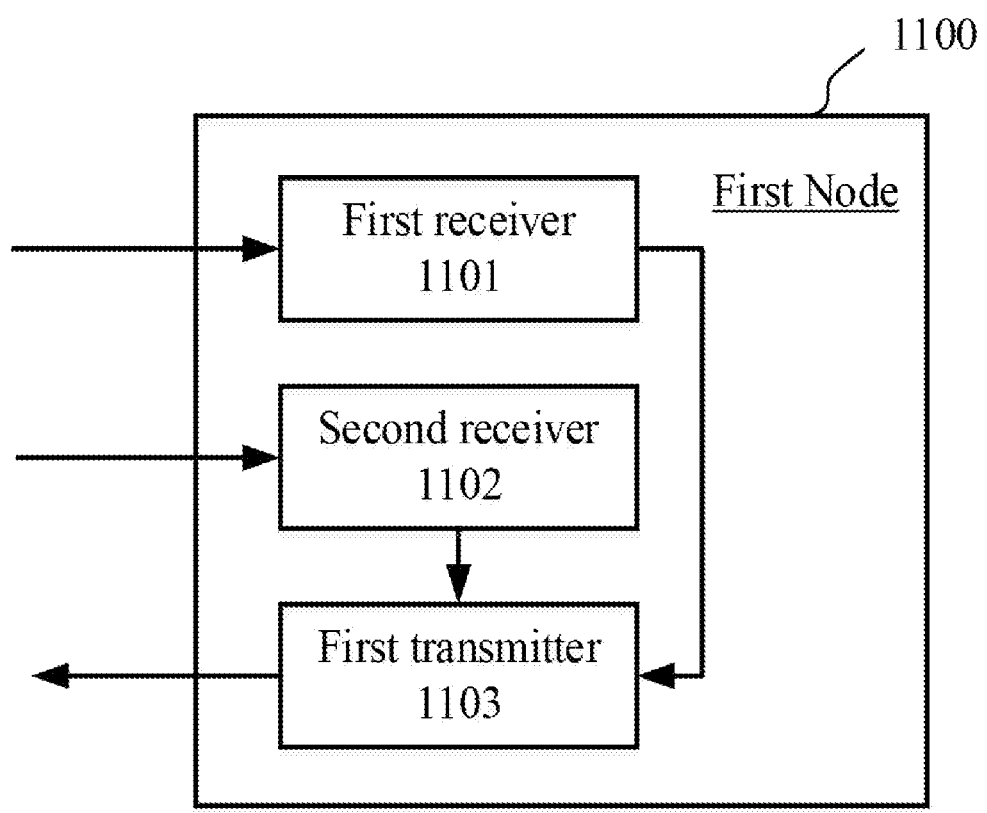
FIG. 11 illustrates a structure block diagram of a processing device in a first node according to one embodiment of the present disclosure.

Embodiment 11 illustrates a structure block diagram of a processing device in a first node, as shown in FIG. 11. In Embodiment 11, a first node processing device 1100 is composed of a first receiver 1101, a second receiver 1102 and a first transmitter 1103.

In one embodiment, the first receiver 1101 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the second receiver 1102 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1103 comprises at least one of the antenna 452, the transmitter/receiver 454, the multi-antenna transmitting processor 457, the transmitting processor 468, the controller/processor 468, the controller/processor 459, the memory 460 or the data source 467 in FIG. 4 of the present disclosure.

In Embodiment 11, the first receiver 1101 receives a first information element, the first information element being used for indicating a first reference power value; the first receiver 1101 receives a second information set, the second information set comprising a second information element, the second information element being used for indicating a second limit power value; and the first transmitter 1103 transmits a first radio signal with a first power value; a target receiver of the first radio signal includes a transmitter of the first information element, the first power value is related to a smaller value between the first reference power value and the second limit power value.

In one embodiment, the second receiver 1102 receives a first target radio signal so as to determine a first power compensation; the second receiver 1102 receives a second target signal set, wherein the second target signal set comprises a second target radio signal, the second target radio signal is used for determining a second power compensation; a transmitter of the first target radio signal and a transmitter of the first information element are co-located, while a transmitter of the second target radio signal and a transmitter of the second information element are co-located; the second limit power value is related to the first power compensation and the second power compensation.

In one embodiment, the first information element indicates a first coefficient; the second limit power value is linearly correlated with the first coefficient.

In one embodiment, the second information element indicates a second power offset; the second limit power value is linearly correlated with the second power offset.

In one embodiment, the second information set comprises Q second-type information elements, the second information element is one of the Q second-type information elements, Q is a positive integer greater than 1; the Q second-type information elements are respectively used for indicating Q limit power values, the second limit power value is a smallest value of the Q limit power values.

In one embodiment, the first power value is a smaller value between a maximum transmitting power value and a first candidate power value, the first candidate power value is linearly correlated with a smaller value between the first reference power value and the second limit power value, with a correlation coefficient being 1.

In one embodiment, the first transmitter 1103 transmits a second radio signal with a second power value; the first information element is used for indicating a first limit power value, and the second information element is used for indicating a second reference power value; a target receiver of the second radio signal includes a transmitter of the second information element, the second power value is related to a smaller value between the second reference power value and the first limit power value.

In one embodiment, the first node 1100 is a UE.
In one embodiment, the first node 1100 is a relay node.
In one embodiment, the first node 1100 is a base station.
In one embodiment, the first node 1100 is vehicle-mounted equipment.
In one embodiment, the first node 1100 is a UE supporting V2X communications.
In one embodiment, the first node 1100 is a relay node supporting V2X communications.

Embodiment 12

Figure 12:
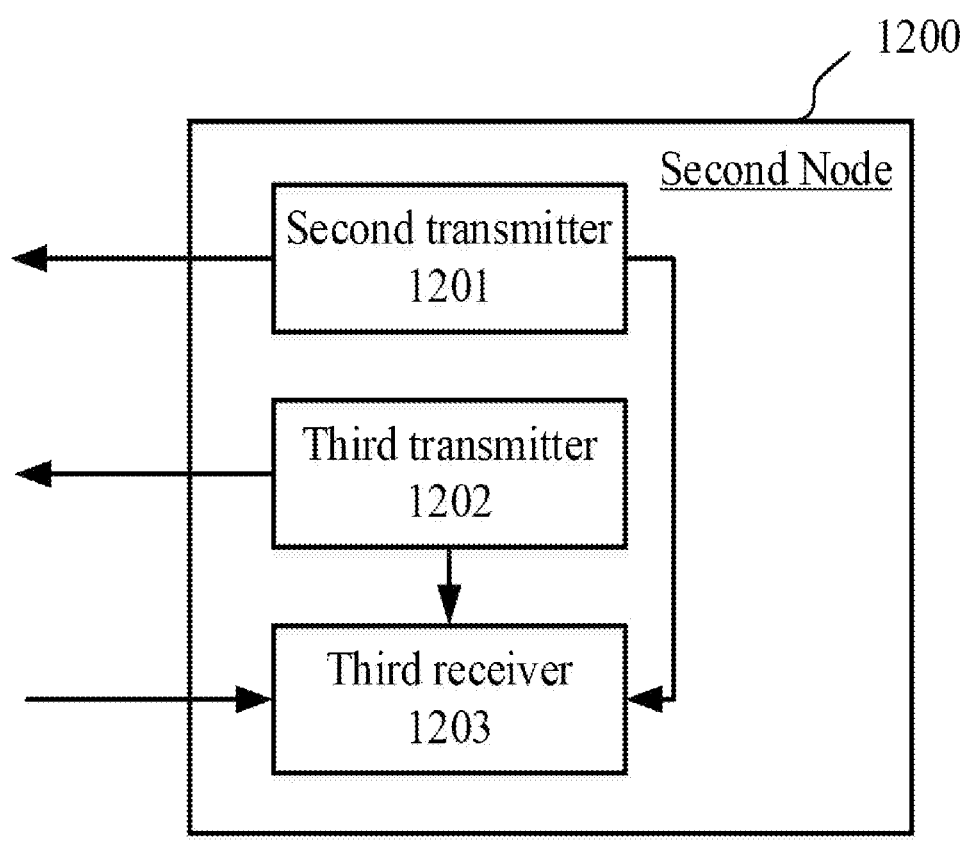
FIG. 12 illustrates a structure block diagram of a processing device in a second node according to one embodiment of the present disclosure.

Embodiment 12 illustrates a structure block diagram of a processing device in a second node, as shown in FIG. 12. In FIG. 12, a second node processing device 1200 is composed of a second transmitter 1201, a third transmitter 1202 and a third receiver 1203.

In one embodiment, the second transmitter 1201 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the third transmitter 1202 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the third receiver 1203 comprises at least one of the antenna 420, the transmitter/receiver 418, the multi-antenna receiving processor 472, the receiving processor 470, the controller/processor 475 or the memory 476 in FIG. 4 of the present disclosure.

In Embodiment 12, the second transmitter 1201 transmits a first information element, the first information element being used for indicating a first reference power value; the third receiver 1203 receives a first radio signal; a first power value is a transmitting power of the first radio signal, the first power value is related to a smaller value between the first reference power value and a second limit power value, the second limit power value is indicated by a second information element, the second information element belongs to a second information set, a target receiver of the second information set includes a transmitter of the first radio signal.

In one embodiment, the third transmitter 1202 transmits a first target radio signal, the first target radio signal being used for determining a first power compensation; a second target radio signal is used for determining a second power compensation, a transmitter of the second target radio signal and a transmitter of the second information element are co-located, the second target radio signal belongs to a second target signal set, a target receiver of the second target signal set includes a target receiver of the first target radio signal; the second limit power value is related to the first power compensation and the second power compensation.

In one embodiment, the first information element indicates a first coefficient; the second limit power value is linearly correlated with the first coefficient.

In one embodiment, the second information element indicates a second power offset; the second limit power value is linearly correlated with the second power offset.

In one embodiment, the second information set comprises Q second-type information elements, the second information element is one of the Q second-type information elements, Q is a positive integer greater than 1; the Q second-type information elements are respectively used for indicating Q limit power values, the second limit power value is a smallest value of the Q limit power values.

In one embodiment, the first power value is a smaller value between a maximum transmitting power value and a first candidate power value, the first candidate power value is linearly correlated with a smaller value between the first reference power value and the second limit power value, with a correlation coefficient being 1.

In one embodiment, the first information element is used for indicating a first limit power value, the second information element is used for indicating a second reference power value; a target receiver of the second radio signal includes a transmitter of the second information element, and the target receiver of the second radio signal does not include the second node; a second power value is a transmitting power of the second radio signal, the second power value is related to a smaller value between the second reference power value and the first limit power value.

In one embodiment, the second node 1200 is a UE.

In one embodiment, the second node 1200 is a base station.

In one embodiment, the second node 1200 is a relay node.

In one embodiment, the second node 1200 is a UE supporting V2X communications.

In one embodiment, the second node 1200 is a base station supporting V2X communications.

In one embodiment, the second node 1200 is relay node supporting V2X communications.

Embodiment 13

Figure 13:
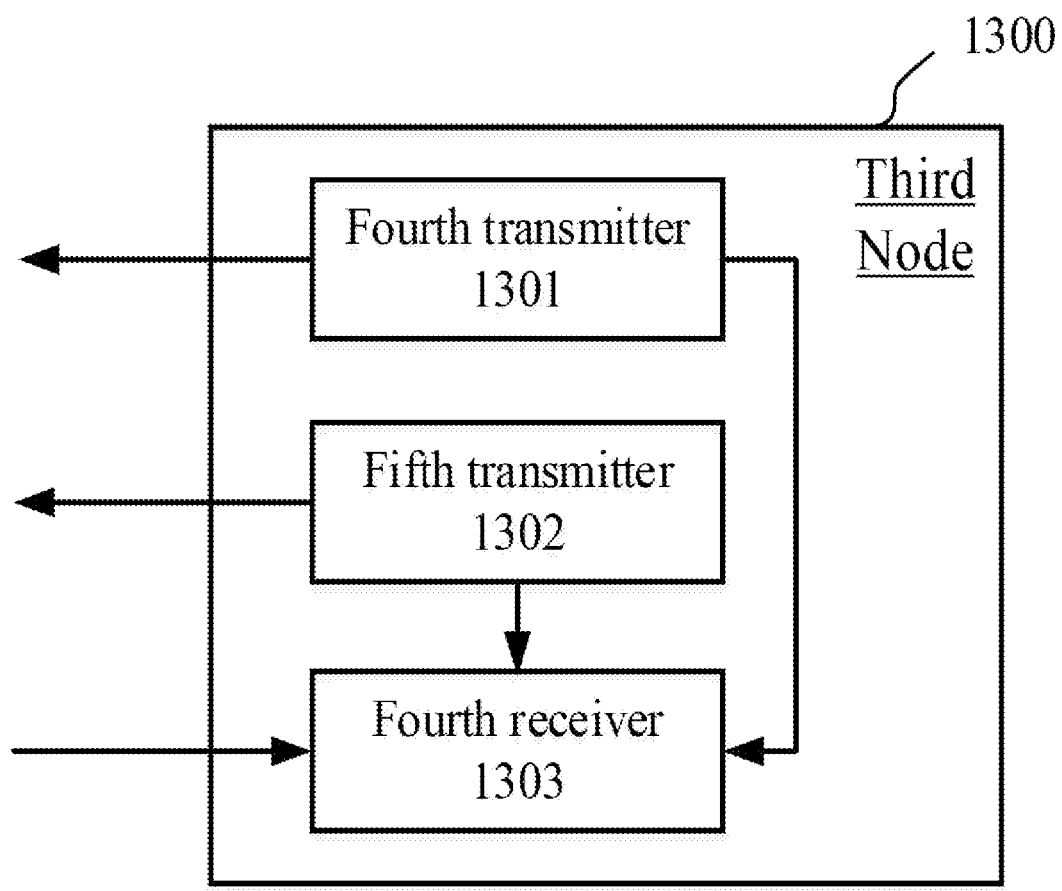
FIG. 13 illustrates a structure block diagram of a processing device in a third node according to one embodiment of the present disclosure.

Embodiment 13 illustrates a structure block diagram of a processing device in a third node, as shown in FIG. 13. In FIG. 13, a third node processing device 1300 is composed of a fourth transmitter 1301, a fifth transmitter 1302 and a fourth receiver 1303.

In one embodiment, the fourth transmitter 1301 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the fifth transmitter 1302 comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the fourth receiver 1303 comprises at least one of the antenna 420, the transmitter/receiver 418, the multi-antenna receiving processor 472, the receiving processor 470, the controller/processor 475 or the memory 476 in FIG. 4 of the present disclosure.

In Embodiment 13, the fourth transmitter 1301 transmits a second information element, wherein the second information element belongs to a second information set, and the second information element is used for indicating a second limit power value; a first reference power value is indicated by a first information element, a first power value is a transmitting power of the first radio signal, the first power value is related to a smaller value between the first reference power and the second limit power value, a target receiver of the second information set includes a transmitter of the first radio signal, a target receiver of the first radio signal does not include the third node 1300.

In one embodiment, the fifth transmitter 1302 transmits a second target radio signal, the second target radio signal being used for determining a second power compensation; a first target radio signal is used for determining a first power compensation, a transmitter of the first target radio signal and a transmitter of the first information element are co-located; the second target radio signal belongs to a second target signal set, a target receiver of the second target signal set includes a target receiver of the second target radio signal; the second limit power value is related to the first power compensation and the second power compensation.

In one embodiment, the first information element indicates a first coefficient; the second limit power value is linearly correlated to the first coefficient.

In one embodiment, the second information element indicates a second power offset; the second limit power value is linearly correlated to the second power offset.

In one embodiment, the second information set comprises Q second-type information elements, the second information element is one of the Q second-type information elements, the Q is a positive integer greater than 1; the Q second-type information elements are respectively used for indicating Q limit power values, the second limit power value is a smallest value of the Q limit power values.

In one embodiment, the first power value is a smaller value between a maximum transmitting power value and a first candidate power value, the first candidate power value is linearly correlated with a smaller value between the first reference power value and the second limit power value, with a correlation coefficient being 1.

In one embodiment, the fourth receiver 1303 receives a second radio signal; a second power value is a transmitting power of the second radio signal, the first information element is used for indicating a first limit power value, and the second information element is used for indicating; the second power value is related to a smaller value between the second reference power value and the first limit power value.

In one embodiment, the third node 1300 is a UE.

In one embodiment, the third node 1300 is a base station.

In one embodiment, the third node 1300 is a relay node.

In one embodiment, the third node 1300 is a UE supporting V2X communications.

In one embodiment, the third node 1300 is a base station supporting V2X communications.

In one embodiment, the third node 1300 is a relay node supporting V2X communications.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base station, aerial base station, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:
  receiving a first information element, the first information element being used for indicating a first reference power value, the first information element is transmitted on a Physical Sidelink Shared Channel (PSSCH);
  receiving a second information element, the second information element being used for indicating a second limit power value, the second information element is transmitted on a Physical Downlink Shared Channel (PDSCH); and
  transmitting a first radio signal with a first power value, the first radio signal is transmitted on another PSSCH;
  wherein a target receiver of the first radio signal is a transmitter of the first information element; the first power value is a second smaller value between a maximum transmitting power value and a first candidate power value,
  the first candidate power value is linearly correlated with a first smaller value between the first reference power value and the second limit power value, with a correlation coefficient being 1, the maximum transmitting power value is $P_{CMAX}$; and
  the first radio signal is transmitted via unicast,
  wherein the first reference power value includes a sum of a first nominal reference power value and a first UE reference power value, the first nominal reference power value is provided by a radio resource control (RRC) layer signaling, the first information element is used for indicating the first UE reference power value.

2. The method in the first node according to claim 1, wherein the second limit power value is equal to a sum of a second reference power value, a second power offset and a second power compensation, the second information element is used for indicating the second reference power value, the second information element comprises one or more fields in an Information Element (IE) of another RRC layer signaling.

3. The method in the first node according to claim 2, comprising:
  receiving a second target signal set;
  wherein the second target signal set comprises at least one second-type target radio signal, a second target radio signal is one of the at least one second-type target radio signal, the second target radio signal is a reference signal (RS), the second target radio signal is used for determining the second power compensation; a transmitter of the second target radio signal and a transmitter of the second information element are co-located.

4. The method in the first node according to claim 3, wherein the second power compensation is a product of a second pathloss and a second coefficient, the second pathloss is a pathloss from the transmitter of the second target radio signal to the first node, the second coefficient is configurable, or the second coefficient is equal to 1.

5. The method in the first node according to claim 4, comprising:
  receiving a first target radio signal so as to determine a first power compensation;
  wherein the first target radio signal comprises one or more fields of a piece of sidelink control information (SCI); the first reference power is smaller than the second limit power value, the first candidate power value is linearly correlated to the first power compensation with the correlation coefficient being 1; the first target radio signal indicates a first pathloss; the first power compensation is equal to a product of the first pathloss and a first coefficient, the first pathloss is a pathloss from the first node to a transmitter of the first target radio signal; the first coefficient is configurable, or the first coefficient is equal to 1.

6. A method in a second node for wireless communication, comprising:
  transmitting a first information element, the first information element being used for indicating a first reference power value, the first information element is transmitted on a Physical Sidelink Shared Channel (PSSCH); and
  receiving a first radio signal, the first radio signal is transmitted on another PSSCH;
  wherein a first power value is a transmitting power of the first radio signal, a second limit power value is indicated by a second information element, the second information element is transmitted on a Physical Downlink Shared Channel (PDSCH), a target receiver of the second information element is a transmitter of the first radio signal; the first power value is a second smaller value between a maximum transmitting power value and a first candidate power value, the first candidate power value is linearly correlated with a first smaller value between the first reference power value and the second limit power value, with a correlation coefficient being 1, the maximum transmitting power value is PCMAX; and the first radio signal is transmitted via unicast,
  wherein the first reference power value includes a sum of a first nominal reference power value and a first UE reference power value, the first nominal reference power value is provided by a radio resource control (RRC) layer signaling, the first information element is used for indicating the first UE reference power value.

7. The method in the second node according to claim 6, wherein the second limit power value is equal to a sum of a second reference power value, a second power offset and a second power compensation, the second information element is used for indicating the second reference power value, the second information element comprises one or more fields in an Information Element (IE) of another RRC layer signaling.

8. The method in the second node according to claim 7, wherein a second target signal set comprises at least one second-type target radio signal, a second target radio signal is one of the at least one second-type target radio signal, the second target radio signal is a reference signal (RS); the second target radio signal is used for determining the second power compensation, a transmitter of the second target radio signal and a transmitter of the second information element are co-located.

9. The method in the second node according to claim 8, wherein the second power compensation is a product of a second pathloss and a second coefficient, the second pathloss is a pathloss from the transmitter of the second target radio signal to the receiver of the first target radio signal, the second coefficient is configurable, or the second coefficient is equal to 1.

10. The method in the second node according to claim 9, comprising:
  transmitting a first target radio signal, the first target radio signal being used for determining a first power compensation;

wherein the first target radio signal comprises one or more fields of a piece of sidelink control information (SCI); the first reference power is smaller than the second limit power value, the first candidate power value is linearly correlated to the first power compensation with the correlation coefficient being 1; the first target radio signal is used for indicating a first pathloss; the first power compensation is equal to a product of the first pathloss and a first coefficient, the first pathloss is a pathloss from a transmitter of the first target radio signal to the second node; the first coefficient is configurable, or the first coefficient is equal to 1.

11. A first node for wireless communication, comprising:
a first receiver, receiving a first information element, the first information element being used for indicating a first reference power value, the first information element is transmitted on a Physical Sidelink Shared Channel (PSSCH);
wherein the first receiver receives a second information element, the second information element being used for indicating a second limit power value, the second information element is transmitted on a Physical Downlink Shared Channel (PDSCH); and
a first transmitter, transmitting a first radio signal with a first power value, the first radio signal is transmitted on another PSSCH;
wherein a target receiver of the first radio signal is a transmitter of the first information element;
the first power value is a second smaller value between a maximum transmitting power value and a first candidate power value, the first candidate power value is linearly correlated with a first smaller value between the first reference power value and the second limit power value, with a correlation coefficient being 1, the maximum transmitting power value is $P_{CMAX}$; and
the first radio signal is transmitted via unicast,
wherein the first reference power value includes a sum of a first nominal reference power value and a first UE reference power value, the first nominal reference power value is provided by a radio resource control (RRC) layer signaling, the first information element is used for indicating the first UE reference power value.

12. The first node according to claim 11, wherein the second limit power value is equal to a sum of a second reference power value, a second power offset and a second power compensation, the second information element is used for indicating the second reference power value, the second information element comprises one or more fields in an Information Element (IE) of another RRC layer signaling.

13. The first node according to claim 12, comprising:
a second receiver, receiving a second target signal set; the second target signal set comprising at least one second-type target radio signal, a second target radio signal is one of the at least one second-type target radio signal, the second target radio signal is a reference signal (RS), the second target radio signal being used for determining the second power compensation; a transmitter of the second target radio signal and a transmitter of the second information element are co-located.

14. The first node according to claim 13, wherein the second power compensation is a product of a second pathloss and a second coefficient, the second pathloss is a pathloss from the transmitter of the second target radio signal to the first node, the second coefficient is configurable, or the second coefficient is equal to 1.

15. The first node according to claim 11, wherein the second receiver receives a first target radio signal so as to determine a first power compensation; the first target radio signal comprises one or more fields of a piece of sidelink control information (SCI); a transmitter of the first target radio signal and a transmitter of the first information element are co-located; the first reference power is smaller than the second limit power value, the first candidate power value is linearly correlated to the first power compensation with the correlation coefficient being 1; the first target radio signal indicates a first pathloss; the first power compensation is equal to a product of the first pathloss and a first coefficient, the first pathloss is a pathloss from the first node to a transmitter of the first target radio signal; the first coefficient is configurable, or the first coefficient is equal to 1.

16. A second node for wireless communication, comprising:
a second transmitter, transmitting a first information element, the first information element being used for indicating a first reference power value, the first information element is transmitted on a Physical Sidelink Shared Channel (PSSCH); and
a third receiver, receiving a first radio signal, the first radio signal is transmitted on another PSSCH; a first power value is a transmitting power of the first radio signal, a second limit power value is indicated by a second information element, the second information element is transmitted on a Physical Downlink Shared Channel (PDSCH), a target receiver of the second information element is a transmitter of the first radio signal; the first power value is a second smaller value between a maximum transmitting power value and a first candidate power value, the first candidate power value is linearly correlated with a first smaller value between the first reference power value and the second limit power value, with a correlation coefficient being 1, the maximum transmitting power value is PCMAX; and
the first radio signal is transmitted via unicast,
wherein the first reference power value includes a sum of a first nominal reference power value and a first UE reference power value, the first nominal reference power value is provided by a radio resource control (RRC) layer signaling, the first information element is used for indicating the first UE reference power value.

17. The second node according to claim 16, wherein the second limit power value is equal to a sum of a second reference power value, a second power offset and a second power compensation, the second information element is used for indicating the second reference power value, the second information element comprises one or more fields in an Information Element (IE) of another RRC layer signaling.

18. The second node according to claim 17, wherein a second target signal set comprises at least one second-type target radio signal, a second target radio signal is one of the at least one second-type target radio signal, the second target radio signal is a reference signal (RS); the second target radio signal is used for determining the second power compensation, a transmitter of the second target radio signal and a transmitter of the second information element are co-located.

19. The second node according to claim 18, wherein the second power compensation is a product of a second pathloss and a second coefficient, the second pathloss is a pathloss from the transmitter of the second target radio signal to the receiver of the first target radio signal, the second coefficient is configurable, or the second coefficient is equal to 1.

20. The second node according to claim 19, comprising:
transmitting a first target radio signal, the first target radio signal being used for determining a first power compensation;
wherein the first target radio signal comprises one or more fields of a piece of sidelink control information (SCI); the first reference power is smaller than the second limit power value, the first candidate power value is linearly correlated to the first power compensation with the correlation coefficient being 1; the first target radio signal is used for indicating a first pathloss; the first power compensation is equal to a product of the first pathloss and a first coefficient, the first pathloss is a pathloss from a transmitter of the first target radio signal to the second node; the first coefficient is configurable, or the first coefficient is equal to 1.

* * * * *